US010452953B2

(12) United States Patent
Hirano et al.

(10) Patent No.: US 10,452,953 B2
(45) Date of Patent: Oct. 22, 2019

(54) IMAGE PROCESSING DEVICE, IMAGE PROCESSING METHOD, PROGRAM, AND INFORMATION RECORDING MEDIUM

(71) Applicant: Rakuten, Inc., Tokyo (JP)

(72) Inventors: Hiromi Hirano, Tokyo (JP); Udana Bandara, Tokyo (JP)

(73) Assignee: Rakuten, Inc., Tokyo (JP)

(\*) Notice: Subject to any disclaimer, the term of this patent is extended or adjusted under 35 U.S.C. 154(b) by 308 days.

(21) Appl. No.: 14/431,304

(22) PCT Filed: May 30, 2013

(86) PCT No.: PCT/JP2013/065116
§ 371 (c)(1),
(2) Date: Mar. 26, 2015

(87) PCT Pub. No.: WO2014/050210
PCT Pub. Date: Apr. 3, 2014

(65) Prior Publication Data
US 2015/0302587 A1 Oct. 22, 2015

(30) Foreign Application Priority Data
Sep. 26, 2012 (JP) .................................. 2012-213030

(51) Int. Cl.
*H04N 5/253* (2006.01)
*G06K 9/62* (2006.01)
(Continued)

(52) U.S. Cl.
CPC ....... *G06K 9/6215* (2013.01); *H04N 5/23296* (2013.01); *H04N 7/18* (2013.01)

(58) Field of Classification Search
CPC ..... G06T 7/0042; H04N 5/23296; H04N 7/18
(Continued)

(56) References Cited

U.S. PATENT DOCUMENTS 4,969,106 A * 11/1990 Vogel .................. G01B 11/165
382/108
6,128,405 A * 10/2000 Fujii .................. G01B 11/2509
356/602
(Continued)

FOREIGN PATENT DOCUMENTS

JP   H01-239406 A   9/1989
JP   2003-271045 A  9/2003
(Continued)

OTHER PUBLICATIONS

English Translation of International Search Report for PCT/JP2013/065116 dated Jul. 2, 2013.
(Continued)

*Primary Examiner* — Sath V Perungavoor
*Assistant Examiner* — Amir Shahnami
(74) *Attorney, Agent, or Firm* — HEA Law PLLC

(57) ABSTRACT

A plurality of captured images obtained by repeatedly shooting a rotating object are obtained. In a case where a feature point corresponding to a certain point on the object is specified in one captured image and another captured image, a position information obtaining unit obtains position information relating to a position of the feature point in the one captured image and the another captured image. A rotation angle information obtaining unit obtains rotation angle information relating to a rotation angle of the object between a point of time when the one captured image is shot and a point of time when the another captured image is shot based on position information. A moving image data generating unit generates moving image data by selecting frame images of the moving image data from the plurality of photographed images based on rotation angle information of each of the plurality of photographed images.

22 Claims, 18 Drawing Sheets

(51) Int. Cl.
*H04N 7/18* (2006.01)
*H04N 5/232* (2006.01)

(58) Field of Classification Search
USPC .......................................................... 348/135
See application file for complete search history.

(56) References Cited

U.S. PATENT DOCUMENTS

| | | |
|---|---|---|
| 2003/0038801 A1 | 2/2003 | Terauchi et al. |
| 2003/0210461 A1 | 11/2003 | Ashizaki et al. |
| 2004/0227751 A1* | 11/2004 | Anders .................. G06T 7/579 345/419 |
| 2009/0096664 A1* | 4/2009 | Carroll .................. G01S 7/4026 342/147 |
| 2012/0082347 A1 | 4/2012 | Kim et al. |
| 2012/0294549 A1* | 11/2012 | Doepke ................. G06T 3/4038 382/294 |
| 2013/0329014 A1* | 12/2013 | Obata ............... H04M 1/72522 348/46 |

FOREIGN PATENT DOCUMENTS

| | | |
|---|---|---|
| JP | 2003-299644 A | 10/2003 |
| JP | 2009-042900 A | 2/2009 |
| JP | 2011-013121 A | 1/2011 |
| JP | 2012-124745 A | 6/2012 |
| JP | 2012-175694 A | 9/2012 |

OTHER PUBLICATIONS

"The Coolest App At SXSW-Arqball Spin", published on Mar. 13, 2012. http://erickschonfeld.com/2012/03/13/coolest-app-sxsw-arqball-spin/ Pertinent parts discussed in "Background Art" of the specification.
The partial translation of OA for corresponding Patent Application No. JP2012-213030 dated Jul. 14, 2015.
John W. Roach et al:"Determining the Movement of Objects from a Sequence of Images", IEEE Transactions on Pattern Analysis and Machine Intelligence, Nov. 6, 1980(Nov. 6, 1980), pp. 554-562,XP055531356, Retrieved from the Internet:URL:https://ieeexplore.ieee.org/ielx5/34/6447692/0644703.pdf?tp=&arnumber=6447703&isnumber=6447692 [retrieved on Dec. 7, 2018].

* cited by examiner

FIG.13

| IMAGE NUMBER OF CAPTURED IMAGE DATA | CUMULATIVE PSEUDO-ROTATION ANGLE | FRAME NUMBER OF MOVING IMAGE DATA |
|---|---|---|
| 1 |  | 1 |
| 2 | $\Delta\theta_{1,2} < \theta_T$ |  |
| 3 | $\Delta\theta_{1,2} + \Delta\theta_{2,3} < \theta_T$ |  |
| 4 | $\Delta\theta_{1,2} + \Delta\theta_{2,3} + \Delta\theta_{3,4} \geqq \theta_T$ | 2 |
| 5 | $\Delta\theta_{4,5} < \theta_T$ |  |
| 6 | $\Delta\theta_{4,5} + \Delta\theta_{5,6} \geqq \theta_T$ | 3 |
| 7 | $\Delta\theta_{6,7} < \theta_T$ |  |
| 8 | $\Delta\theta_{6,7} + \Delta\theta_{7,8} < \theta_T$ |  |
| 9 | $\Delta\theta_{6,7} + \Delta\theta_{7,8} + \Delta\theta_{8,9} \geqq \theta_T$ | 4 |
| ⋮ | ⋮ | ⋮ |
| i | $\Delta\theta_{i-2,i-1} + \Delta\theta_{i-1,i} \geqq \theta_T$ | j |
| i+1 | $\Delta\theta_{i,i+1} < \theta_T$ |  |
| i+2 | $\Delta\theta_{i,i+1} + \Delta\theta_{i+1,i+2} < \theta_T$ |  |
| i+3 | $\Delta\theta_{i,i+1} + \Delta\theta_{i+1,i+2} + \Delta\theta_{i+2,i+3} \geqq \theta_T$ | j+1 |
| ⋮ | ⋮ | ⋮ |

FIG.14

| IMAGE NUMBER OF CAPTURED IMAGE DATA | PSEUDO-ROTATION ANGLE | FRAME NUMBER OF MOVING IMAGE DATA |
|---|---|---|
| 1 | | 1 |
| 2 | $\Delta\theta_{1,2} < \theta_T$ | |
| 3 | $\Delta\theta_{1,3} < \theta_T$ | |
| 4 | $\Delta\theta_{1,4} \geq \theta_T$ | 2 |
| 5 | $\Delta\theta_{4,5} < \theta_T$ | |
| 6 | $\Delta\theta_{4,6} \geq \theta_T$ | 3 |
| 7 | $\Delta\theta_{6,7} < \theta_T$ | |
| 8 | $\Delta\theta_{6,8} < \theta_T$ | |
| 9 | $\Delta\theta_{6,9} \geq \theta_T$ | 4 |
| ⋮ | ⋮ | ⋮ |
| i | $\Delta\theta_{i-2,i} \geq \theta_T$ | j |
| i+1 | $\Delta\theta_{i,i+1} < \theta_T$ | |
| i+2 | $\Delta\theta_{i,i+2} < \theta_T$ | |
| i+3 | $\Delta\theta_{i,i+3} \geq \theta_T$ | j+1 |
| ⋮ | ⋮ | ⋮ |

IMAGE PROCESSING DEVICE, IMAGE PROCESSING METHOD, PROGRAM, AND INFORMATION RECORDING MEDIUM

CROSS REFERENCE TO RELATED APPLICATIONS

This application is a National Stage of International Application No. PCT/JP2013/065116 filed on May 30, 2013, claims priority to Japanese Patent Application No. 2012-213030 filed on Sep. 26, 2012. The contents of each of the above documents are incorporated herein by reference in their entirety.

TECHNICAL FIELD

The present invention relates to an image processing device, an image processing method, a program, and an information storage medium.

BACKGROUND ART

As a method to shoot (image) an entire circumference of an object, a method is known in which an object is shot while mechanically rotating a turntable, on which the object is placed at the center, at a constant angular velocity (Non-Patent Literature 1). In addition, an application program is also known in which a user is allowed to rotate an object displayed on a screen arbitrarily with use of the captured image data obtained in this manner (Non-Patent Literature 1).

In the application program disclosed in Non-Patent Literature 1, it is configured that, when a user slides a finger on a touch panel, a frame of the captured image data moves back and forth by a number based on the slide amount. As a result, the object is rotated by an angle based on the slide amount of the user, and thus the user can view the object from any direction. Such a technology enables a user, for example, to view a product from an arbitrary direction on a website where the product is sold.

CITATION LIST

Non-Patent Document

Non-Patent Literature 1: "The Coolest AppAtSXSW-Arqball Spin". [online]. Mar. 13, 2012. [retrieved on Jul. 26, 2012]. Retrieved from the Internet: <URL:http://erickschonfeld.com/2012/03/13/coolest-app-sxsw-arqball-spin/>.

SUMMARY OF INVENTION

Technical Problem

The above described technology requires a turntable that rotates mechanically at a constant angular velocity, and a preparation of such a turntable takes considerable costs or labors. In contrast, in the case of a turntable that is manually rotated, costs and labors can be reduced.

However, if a turntable that is rotated manually is used, the angular velocity of the object is not constant, and thus a rotation angle of the object for each frame is not constant in the captured image data. As such, when such captured image data is reproduced as it is, a rotational speed of the object is not constant. Further, in a case where such captured image data is used in the above described application program as it is, the rotation angle of the object based on the user's slide amount is not constant. As a result, sometimes users may feel uncomfortable.

In order to solve such an inconvenience, it is necessary to provide technology for obtaining moving image data in which a rotation angle of an object is approximately constant for each frame, based on captured image data obtained by shooting an object rotating at a non-constant angular velocity.

One or more embodiments of the present invention have been conceived in view of the above, and an object thereof is to provide an image processing device, an image processing method, a program, and an information storage medium capable of obtaining moving image data in which a rotation angle of an object is approximately constant for each frame, based on captured image data obtained by shooting an object rotating at a non-constant angular velocity.

Solution to Problem

In order to solve the above described problems, an image processing device according to the present invention includes captured image obtaining means for obtaining a plurality of captured images that are obtained by repeatedly shooting an object while the object rotates, feature point specifying means for specifying one or more feature points in the captured images, position information obtaining means for obtaining, in a case where a feature point corresponding to a certain point on the object is specified in one captured image and another captured image that is shot after the one captured image, position information relating to positions of the feature point in the one captured image and the another captured image, rotation angle information obtaining means for obtaining rotation angle information relating to a rotation angle of the object between a point of time when the one captured image is shot and a point of time when the another captured image is shot, based on the position information, and moving image data generating means for generating moving image data which shows how the object rotates, by selecting a plurality of frame images of the moving image data from among the plurality of captured images, based on the rotation angle information obtained by the rotation angle information obtaining means for each of the plurality of captured images.

An image processing method according to the present invention includes a captured image obtaining step of obtaining a plurality of captured images that are obtained by repeatedly shooting an object while the object rotates, a feature point specifying step of specifying one or more feature points in the captured images, a position information obtaining step of obtaining, in a case where a feature point corresponding to a certain point on the object is specified in one captured image and another captured image that is shot after the one captured image, position information relating to positions of the feature point in the one captured image and the another captured image, a rotation angle information obtaining step of obtaining rotation angle information relating to a rotation angle of the object between a point of time when the one captured image is shot and a point of time when the another captured image is shot, based on the position information, and a moving image data generating step of generating moving image data by selecting a plurality of frame images of the moving image data, which shows how the object rotates, from among the plurality of captured images, based on the rotation angle information obtained by the rotation angle information obtaining step for each of the plurality of captured images.

A program according to the present invention causes a computer to function as captured image obtaining means for obtaining a plurality of captured images that are obtained by repeatedly shooting an object while the object rotates, feature point specifying means for specifying one or more feature points in the captured images, position information obtaining means for obtaining, in a case where a feature point corresponding to a certain point on the object is specified in one captured image and another captured image that is shot after the one captured image, position information relating to positions of the feature point in the one captured image and the another captured image, rotation angle information obtaining means for obtaining rotation angle information relating to a rotation angle of the object between a point of time when the one captured image is shot and a point of time when the another captured image is shot, based on the position information, and moving image data generating means for generating moving image data by selecting a plurality of frame images of the moving image data, which shows how the object rotates, from among the plurality of captured images, based on the rotation angle information obtained by the rotation angle information obtaining means for each of the plurality of captured images.

An information storage medium according to the present invention is a computer-readable information storage medium that stores the above program.

In an embodiment of the present invention, the moving image data generating means may determine, in a case where the one captured image is selected as a frame image of the moving image data, whether or not to select the another captured image as another frame image of the moving image data based on a result of comparing the rotation angle information with a threshold value.

In an embodiment of the present invention, in a case where the one captured image is selected as a frame image of the moving image data and the rotation angle information is equal to or more than the threshold value, the moving image data generating means may select, as another frame image of the moving image data, either one of the another captured image and a captured image that was shot immediately before the another captured image.

In an embodiment of the present invention, in a case where the rotation angle information relating to a rotation angle of the object between the point of time when the one captured image is shot and the point of time when the another captured image is shot is closer to the threshold value than rotation angle information relating to a rotation angle of the object between the point of time when the one captured image is shot and a point of time when the captured image that was shot immediately before the another captured image is shot, the moving image data generating means may select the another captured image as a frame image of the moving image data, and, in a case where the rotation angle information relating to the rotation angle of the object between the point of time when the one captured image is shot and the point of time when the captured image that was shot immediately before the another captured image is shot is closer to the threshold value than the rotation angle information relating to the rotation angle of the object between the point of time when the one captured image is shot and the point of time when the another captured image is shot, the moving image data generating means may select the captured image that was shot immediately before the another captured image as a frame image of the moving image data.

In an embodiment of the present invention, in a case where a feature point corresponding to a certain point on the object is specified on a first pair of captured images, the position information obtaining means may obtain position information relating to a position of the feature point in one captured image that is shot first among the first pair of captured images and in another captured image that is shot later among the first pair of captured images. The rotation angle information obtaining means may obtain rotation angle information relating to a rotation angle of the object between a point of time when the one captured image of the first pair of captured images is shot and a point of time when the another captured image of the first pair of captured images is shot based on the position information of the first pair of captured images. In a case where a feature point corresponding to a certain point on the object is specified in a second pair of captured images, the position information obtaining means may obtain position information relating to a position of the feature point of one captured image that is shot first among the second pair of captured images and another captured image that is shot later among the second pair of captured images. The rotation angle information obtaining means may obtain rotation angle information relating to a rotation angle of the object between a point of time when the one captured image of the second pair of captured images is shot and a point of time when the another captured image of the second pair of captured images is shot based on the position information of the second pair of captured images. In a case where the another captured image of the first pair of captured images is identical to the one captured image of the second pair of captured images, the moving image data generating means may include means for obtaining cumulative rotation angle information relating to a rotation angle of the object between the point of time when the one captured image of the first pair of captured images is shot and the point of time when the another captured image of the second pair of captured images is shot, based on the rotation angle information of the first pair of captured images and the rotation angle information of the second pair of captured images. The moving image data generating means may select a plurality of frame images of the moving image data from the plurality of captured images based on the cumulative rotation angle information.

In an embodiment of the present invention, in a case where the one captured image of the first pair of captured images is selected as a frame image of the moving image data, the moving image data generating means may determine whether or not to select the another captured image of the second pair of captured images as another frame image of the moving image data, based on a result of comparing the cumulative rotation angle information with the threshold value.

In an embodiment of the present invention, in a case where the one captured image of the first pair of captured images is selected as a frame image of the moving image data and the cumulative rotation angle information is equal to or more than the threshold value, the moving image data generating means may select either one of the another captured image of the second pair of captured images and a captured image that was shot immediately before the another captured image of the second pair of captured images as another frame image of the moving image data.

In an embodiment of the present invention, the rotation angle information obtaining means may include means for obtaining position difference information relating to a difference between the position of the feature point in the one captured image and the position of the feature point in the another captured image, and means for obtaining the rotation angle information based on the position difference information.

In an embodiment of the present invention, the image processing device may include means for setting an area in the captured image as an observation area based on a position of a rotation axis of the object in the captured image, and the rotation angle information obtaining means may obtain the rotation angle information based on the position difference information in a case where the feature point is included in the observation area.

In an embodiment of the present invention, the rotation angle information obtaining means may obtain the rotation angle information using the position difference information of a feature point whose rotation radius of when the object rotates is large, in preference to the position difference information of a feature point whose rotation radius of when the object rotates is small.

In an embodiment of the present invention, the rotation angle information obtaining means may include rotation radius information obtaining means for obtaining, in a case where a plurality of feature points respectively corresponding to a plurality of points on the object are specified in the one captured image and the another captured image, rotation radius information relating to a rotation radius of a point on the object corresponding to the feature point, for each of the plurality of feature points, means for obtaining, for each of the plurality of feature points, rotation angle information relating to a rotation angle of the point corresponding to the feature point on the object between a point of time when the one captured image is shot and a point of time when the another captured image is shot, based on the position difference information and the rotation radius information of the feature points, and means for obtaining the rotation angle information of the object based on the rotation angle information of each of the plurality of feature points.

In an embodiment of the present invention, the rotation radius information obtaining means may include means for obtaining, in a case where the feature point corresponding to the certain point on the object is specified in at least three captured images, elliptical orbit information relating to an elliptical orbit of the feature point based on the position of the feature point in the at least three captured images, and means for obtaining the rotation radius information of the feature point based on the elliptical orbit information of the feature point.

In an embodiment of the present invention, in a case where the feature point corresponding to the certain point on the object is first specified in an ith (i: an integer of 1 or more) captured image and specified last in a jth (j: an integer greater than i) captured image that is shot later than the ith captured image, the rotation radius information obtaining means may obtain the rotation radius information of the feature point based on a position of the feature point in the ith captured image and a position of the feature point in the jth captured image.

In an embodiment of the present invention, the rotation angle information obtaining means may include means for obtaining, in a case where the feature point corresponding to the certain point on the object is specified in at least three captured images, elliptical orbit information relating to an elliptical orbit of the feature point and means for obtaining the rotation angle information based on the positions of the feature point in the one captured image and in the another captured image and the elliptical orbit information.

In an embodiment of the present invention, the moving image data generating means may include means for obtaining similarity information relating to a similarity between a reference captured image that is selected from the plurality of captured images and each of a plurality of captured images that are shot after a predetermined period of time passes from a point of time when the reference captured image is shot, and means for selecting one of the plurality of captured images that are shot after the predetermined period of time passes from the point of time when the reference captured image is shot as a captured image of a point of time when the object completes one rotation based on the similarity information. The moving image data generating means may generate the moving image data showing how the object rotates once based on captured images that are shot before the point of time when the captured image selected as the captured image of the time when the object completes one rotation is shot.

In an embodiment of the present invention, the moving image data generating means may include feature point number obtaining means for obtaining a number of feature points corresponding to feature points specified in the reference captured image, from among the feature points specified in the captured image that is shot after the predetermined period of time passes from the point of time when the reference captured image is shot, means for selecting candidates of the captured image of the point of time when the object completes one rotation, from among the plurality of captured images that are shot after the predetermined period of time passes from the point of time when the reference captured image is shot, based on a result obtained by the feature point number obtaining means, means for obtaining similarity information relating to a similarity between the reference captured image and each of the captured images selected as the candidates, and means for selecting one of the captured images selected as the candidates as the captured image of a point of time when the object completes one rotation based on the similarity information.

In an embodiment of the present invention, the plurality of captured images may include the 1st to mth (m: an integer of 2 or more) captured images and m+1th to m+nth (n: an integer of 1 or more) captured images, which are shot after the mth captured image. The moving image data generating means may include selection number obtaining means for obtaining a number of the captured images selected as frame images of the moving image data out of the 1st to the mth captured images, and means for selecting the frame images of the moving image data out of the m+1th to the m+nth captured images, in a case where the feature point corresponding to the point on the object is not specified in the m+1th to the m+nth captured images, based on a ratio of a number of the 1st to the mth captured images to the number of the captured images obtained by the selection number obtaining means.

In an embodiment of the present invention, the plurality of captured images may include the 1st to mth (m: an integer of 2 or more) captured images and m+1th to m+nth (n: an integer of 1 or more) captured images, which are shot after the mth captured image. The moving image data generating means may include selection number obtaining means for obtaining a number of the captured images selected out of the m+1th to m+nth captured images as the frame images of the moving image data, and means for selecting the frame images of the moving image data out of the 1st to the mth captured images, in a case where the feature point corresponding to the point on the object is not specified in the 1st to the mth captured images, based on a ratio of a number of the m+1th to the m+nth captured images to the number of the captured images obtained by the selection number obtaining means.

In an embodiment of the present invention, the image processing device may include first determination means for determining whether or not a feature amount of the feature point specified in the one captured image and a feature amount of the feature point specified in the another captured image area are the same or substantially the same, second determination means for determining whether or not a difference of a coordinate value of a direction of an axis corresponding to a rotation axis of the object between the position of the feature point specified in the one captured image and the position of the feature point specified in the another captured image is equal to or more than the threshold value, and means for determining whether or not the feature point specified in the one captured image and the feature point specified in the another captured image are feature points corresponding to the certain point on the object based on a determination result of the first determination means and the second determination means.

In an embodiment of the present invention, the image processing device may include determination means for determining whether or not the feature amount of the feature point specified in the one captured image and the feature amount of the feature point specified in the another captured image are the same or substantially the same, comparing means for comparing (a) information relating to a difference of a coordinate value of a direction of a second axis perpendicular to a first axis corresponding to a rotation axis of the object between the position of one feature point in the one captured image and the position of the one feature point in the another captured image with (b) information relating to a difference of a coordinate value of the direction of the second axis between the position of another feature point in the one captured image and the position of the another feature point in the another captured image, in a case where the one feature point having the same or substantially the same feature amount in both of the one captured image and the another captured image, and the another feature point having the same or substantially the same feature amount in both of the one captured image and the another captured image are specified, and means for determining whether or not the feature point specified in the one captured image and the feature point specified in the another captured image are feature points corresponding to the certain point on the object, based on a determination result of the determination means and a comparing result of the comparing means.

In an embodiment of the present invention, the captured image obtaining means may obtain a plurality of captured images that are obtained by repeatedly shooting the object while the object rotates a plurality of times. The moving image data generating means may generate the moving image data that shows how the object rotates once based on the plurality of captured images that are obtained by repeatedly shooting the object while the object rotates the plurality of times.

Advantageous Effects of Invention

According to the present invention, it is possible to obtain moving image data in which a rotation angle of an object is approximately constant for each frame based on captured image data of the object rotating at a non-constant angular velocity.

BRIEF DESCRIPTION OF DRAWINGS

FIG. 13 A diagram for explaining an example of a method for selecting frame images.

FIG. 14 A diagram for explaining another example of a method for selecting frame images.

DESCRIPTION OF EMBODIMENTS

Examples of an embodiment of the present invention will be described below in detail with reference to the accompanying drawings.

Figure 1:
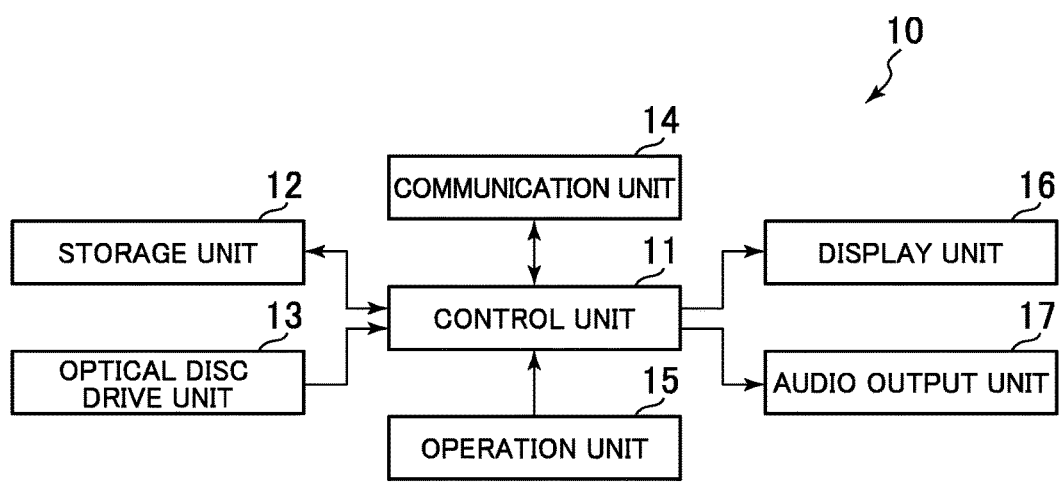
FIG. 1 A diagram illustrating an example of a hardware configuration of an image processing device according to an embodiment of the present invention.

FIG. 1 illustrates an example of a hardware configuration of an image processing device according to an embodiment of the present invention. The image processing device 10 according to this embodiment is implemented by, for example, a personal computer, a server computer, a mobile phone (including a smart phone), or a portable information terminal (including a tablet computer).

As shown in FIG. 1, the image processing device 10 includes a control unit 11, a storage unit 12, an optical disc drive unit 13, a communication unit 14, an operation unit 15, a display unit 16, and an audio output unit 17.

The control unit 11 includes, for example, one or more microprocessors, and executes processing according to an operating system or a program stored in the storage unit 12.

The storage unit 12 includes a main storage unit, such as a RAM, and an auxiliary storage unit, such as a hard disk or a solid-state drive.

The optical disc drive unit 13 reads a program and data stored in an optical disc (information storage medium). The program and data are provided to the storage unit 12 through the optical disc. That is, the program and data stored in the optical disc are read and stored in the storage unit 12. The optical disc drive unit 13 is not an essential element. The image processing device 10 may include an element for reading the program and data stored in an information storage medium other than the optical disc (e.g., memory card). The program and data may be provided to the storage unit 12 through an information storage medium other than the optical disc.

The communication unit 14 is an interface for connecting the image processing device 10 to a communication network. The image processing device 10 is configured to send and receive data to and from other devices through the communication network. The program and data may be provided to the storage unit 12 through the communication network.

The operation unit 15 is a unit for a user to operate. The operation unit 15 includes, for example, a keyboard, a pointing device or the like. The display unit 16 is, for example, a liquid crystal display, an organic EL display or the like, and the audio output unit 17 is, for example, speakers, headphones or the like.

The following explains technology of generating moving image data in which a rotation angle of an object is approximately constant for each frame, based on captured image data of an object rotating at a non-constant angular velocity. In the following, a case is discussed in which moving image data of commercial items is generated. However, the present invention is applicable to a case where moving image data of an object other than a commercial item is generated.

Figure 2:
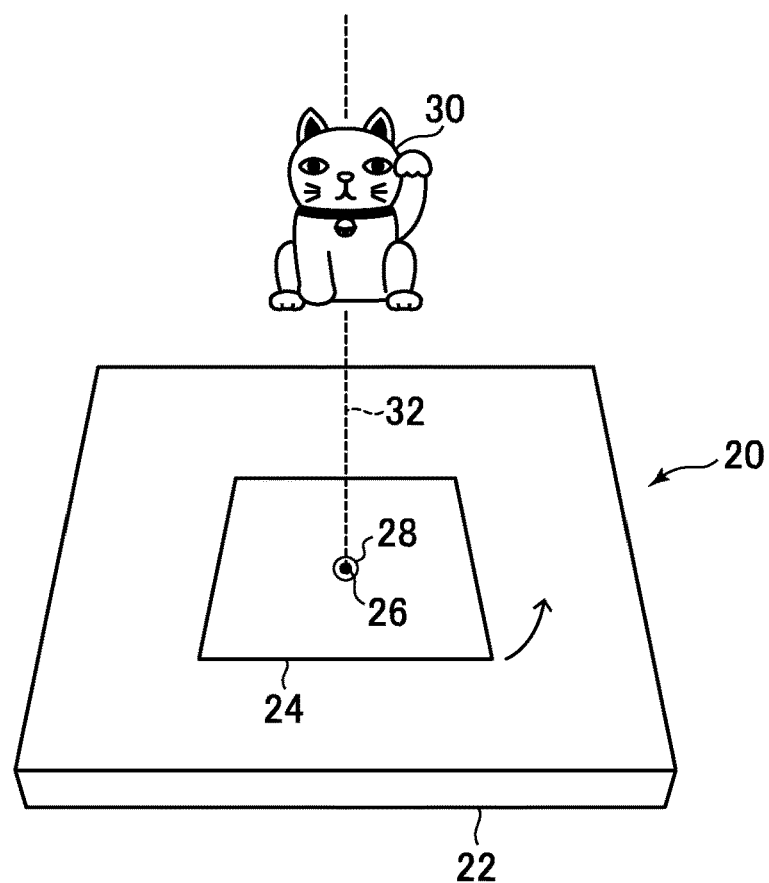
FIG. 2 A diagram for explaining a method of shooting an item.
Figure 3:
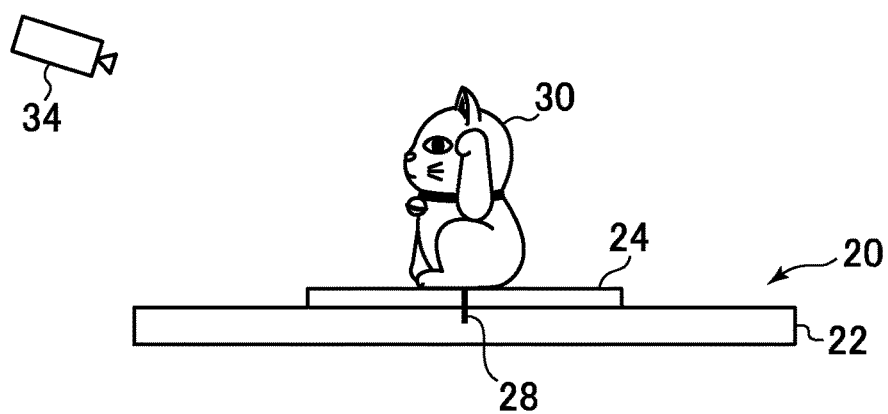
FIG. 3 A diagram for explaining a method of shooting an item.

First, a method for shooting an item will be discussed. FIGS. 2 and 3 illustrate a method for shooting an item. As shown in FIG. 2, when an item 30 (beckoning cat in the example of FIG. 2) is shot, the item 30 is placed on a turntable 20.

The turntable 20 includes a thick board 22, a cardboard 24, and a thumbtack 28. The thick board 22 is a board in which the thumbtack 28 can be safely stuck, and the cardboard 24 is attached to the thick board 22 with the thumbtack 28. The thumbtack 28 is stuck in the center 26 of the cardboard 24.

The item 30 is placed at the center of the cardboard 24. The item 30 is placed so that the center axis of the item 30 matches the center 26 of the cardboard. The cardboard 24 is rotatable with the thumbtack 28 as a rotation axis 32. When a videographer rotates the cardboard 24 manually, the item 30 placed on the cardboard 24 rotates about the rotation axis 32.

As shown in FIG. 3, an shooting device 34 for shooting the item 30 is fixed at the position from which the item 30 placed on the turntable 20 can be shot. In the example shown in FIG. 3, the shooting device 34 is placed in front of the turntable 20 and slightly above the item 30.

The shooting device 34 includes a digital video camera, and can shoot a still image and a moving image. For example, a single digital video camera or a digital video camera built in a mobile phone etc. is used as the shooting device 34. Further, for example, a digital video camera built in the image processing device 10 may be used as the shooting device 34. A digital camera capable of shooting only still images may be used as the shooting device 34.

The shooting device 34 performs shooting at predetermined intervals (e.g., every ⅓₀ seconds). In other words, the shooting device 34 shoots a moving image having the predetermined number (e.g., 30) of frames per second.

The videographer starts shooting with the shooting device 34, and also rotates the cardboard 24, on which the item 30 is placed, counterclockwise (or clockwise). For example, the videographer rotates the cardboard 24 using an index finger and a middle finger alternately. In this case, a moving image of the rotating item 30 is shot by the shooting device 34. This moving image is stored in the storage unit 12 of the image processing device 10 through a storage medium or a communication network. This moving image may be stored in a device other than the image processing device 10.

Instead of shooting a moving image of the item 30, the videographer may continuously shoot still images of the item 30 while the item 30 is rotating. A group of the still images obtained as described above may be used in place of the above moving image.

In the following, a moving image or a group of still images shot by the shooting device 34 is referred to as "captured image data." Each image included in the captured image data is referred to as "captured image." For example, if a moving image shot by the shooting device 34 is captured image data, each frame image of the moving image corresponds to a "captured image." Further, for example, if a group of still images shot by the shooting device 34 is captured image data, each still image corresponds to a "captured image."

In the following, moving image data of an item 30 to be generated based on captured image data, that is, moving image data in which a rotation angle of an item 30 is approximately constant for each frame is simply referred to as "moving image data."

Figure 4:
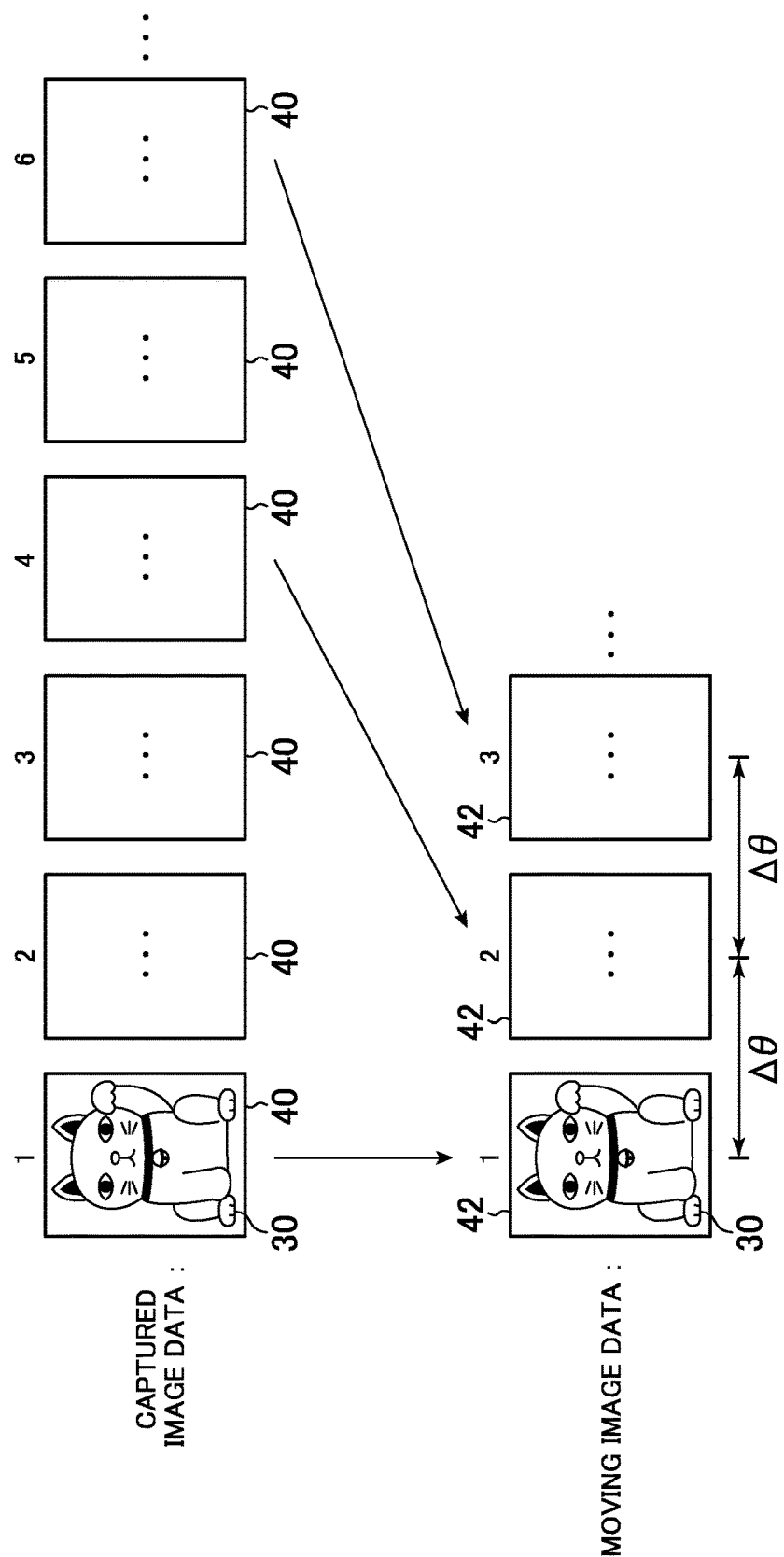
FIG. 4 A diagram for explaining an outline of a method for generating moving image data of an item.

Next, a method for generating moving image data in which a rotation angle of an item 30 is approximately constant for each frame, based on the captured image data as above will be discussed below. FIG. 4 illustrates an outline of a method for generating moving image data.

In FIG. 4, the numbers attached above the captured images 40 included in the captured image data are image numbers. Each image number indicates a shooting order for a captured image. If the captured image data is a moving image, an image number corresponds to a frame number of the moving image. On the other hand, if the captured image data is a group of still images, an image number indicates where a still image in question is in a chronological shooting order. In the following, a captured image 40 with an image number "i", that is, the ith captured image 40 is written as a captured image [i].

In FIG. 4, the numbers attached above the frame images 42 included in the moving image data are frame numbers. In the following, a frame image 42 with a frame number "j", that is, the jth frame image 42 is written as the frame image [j].

As shown in FIG. 4, the image processing device 10 generates moving image data by selecting each frame image 42 constituting the moving image data from the captured images 40.

In particular, the image processing device 10 selects each frame images 42 so that a rotation angle ($\Delta\theta$) of the item 30 in adjacent frame images 42 is approximately constant.

In other words, each frame image 42 is selected so that an angle ($\Delta\theta$) between a representative direction (e.g., front direction) of the item 30 in a frame image 42 and a representative direction of the item 30 in a frame image 42 subsequent to the frame image 42 is approximately constant.

In still other words, each frame image 42 is selected so that a rotation angle (Δθ) of the item 30 between a point of time when a captured image 40 selected as a frame image 42 is shot and a point of time when a captured image 40 selected as a frame image 42 subsequent to the frame image 42 is shot is approximately constant.

In the example shown in FIG. 4, the captured image [1] is selected as the frame image [1]. The captured image [4] is selected as the frame image [2]. The captured image [6] is selected as the frame image [3].

Figure 5:
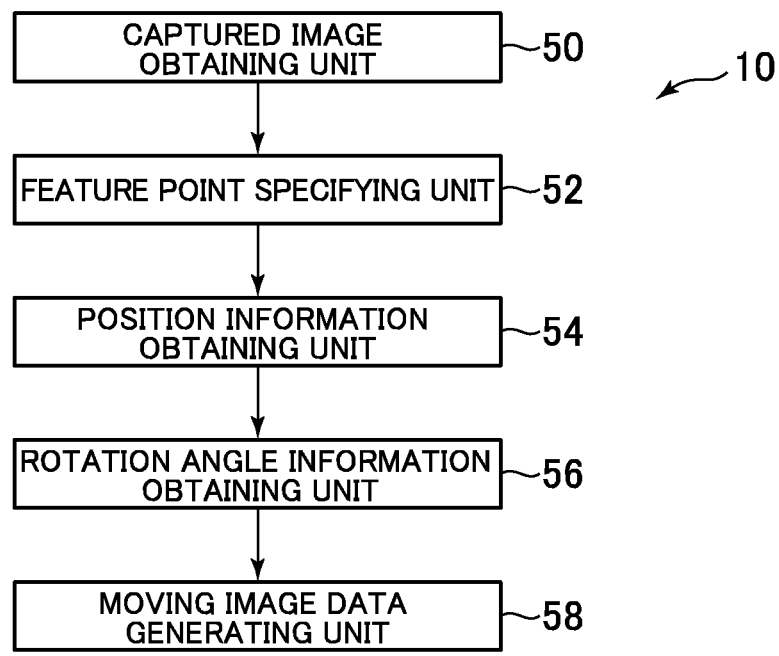
FIG. 5 A functional block diagram illustrating functions implemented in the image processing device.

Next, a constitution for implementing the generating method described above will be discussed. FIG. 5 is a functional block diagram illustrating functions implemented in the image processing device 10.

As shown in FIG. 5, the image processing device 10 includes a captured image obtaining unit 50, a feature point specifying unit 52, a position information obtaining unit 54, a rotation angle information obtaining unit 56, and a moving image data generating unit 58. These functional blocks are implemented by, for example, the control unit 11. That is, the control unit 11 executes processing according to a program, to thereby function as these functional blocks.

The captured image obtaining unit 50 will be discussed. The captured image obtaining unit 50 obtains a plurality of captured images 40 that are obtained by repeatedly shooting an object while the object is rotating. In the above described example, the item 30 corresponds to the "object."

That is, the captured image obtaining unit 50 reads captured image data stored in the storage unit 12. The captured image data may be stored in a device other than the image processing device 10. In other words, the captured image obtaining unit 50 may obtain captured image data stored in a device other than the image processing device 10 through a communication network.

The feature point specifying unit 52 and the position information obtaining unit 54 will be discussed. The feature point specifying unit 52 specifies feature points in captured images 40. In a case where a feature point corresponding to the certain point on the object is specified in a pair of captured images 40, the position information obtaining unit 54 obtains position information of a position of the feature point in one captured image 40 of the pair, which is shot earlier, and a position of the feature point in the other captured image 40 of the pair, which is shot later.

For example, the feature point specifying unit 52 obtains positions and feature amounts of the feature points in the captured images 40 using known algorithm for specifying a feature point. For example, the SURF (Speed-Up Robust Features) algorithm can be used as such an algorithm. An algorithm other than the SURF algorithm may also be utilized. For example, the SIFT (Scale-Invariant Feature Transform) algorithm and the Brisk (Binary Robust Invariant Scalable Keypoints) algorithm may also be utilized.

As will be discussed below, a feature point is used for obtaining information on a rotation angle of the item 30. As such, a feature point included in an area (hereinafter "background area") other than the area in which the item 30 is included is not necessary. Thus, the feature point specifying unit 52 may ignore a feature point in the background area.

For example, the feature point specifying unit 52 obtains a subtraction image between two consecutive captured images 40. The captured image 40 is a captured image of a rotating item 30, and thus, a background area of the captured image 40 is not basically changed. As such, the feature point specifying unit 52 assumes an area having zero pixel value in the subtraction image as a background area, and removes the feature points in this area. In other words, the feature points included in this area are not considered in the position information obtaining unit 54 and the rotation angle information obtaining unit 56.

Figure 6:
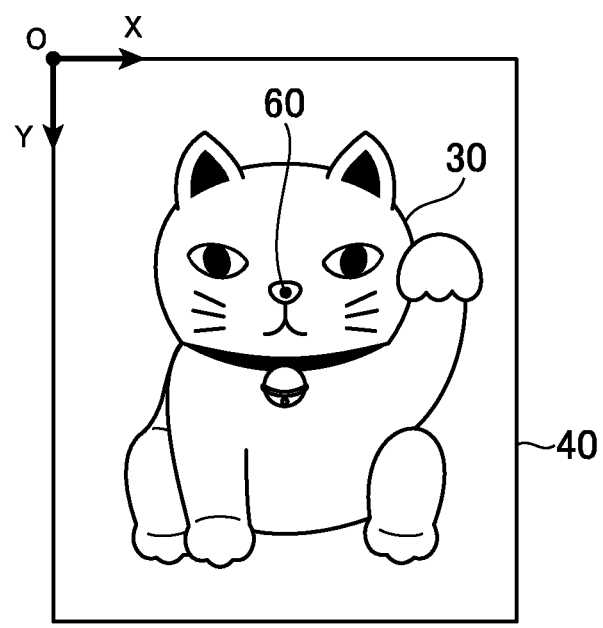
FIG. 6 A diagram illustrating an example of a feature point specified by a feature point specifying unit.

FIG. 6 illustrates an example of a feature point specified by the feature point specifying unit 52. In FIG. 6, a feature point 60 corresponding to a nose of the beckoning cat is specified. In reality, a plurality of feature points 60 are specified in one captured image 40, but they are omitted in FIG. 6. The position of the feature point 60 is represented, for example, by coordinate values of an X-Y coordinate system, in which the upper left vertex of the captured image 40 is the origin O, and the rightward direction and the downward direction of the captured image 40 are the positive X-axis direction and the positive Y-axis direction, respectively.

For example, the feature point 60 corresponding to the nose of the beckoning cat is specified in each of the captured images 40 in which the nose of the beckoning cat is presented. In other words, the feature point 60 corresponding to the certain point on the item 30 is specified in the plurality of captured images 40.

Figure 7:
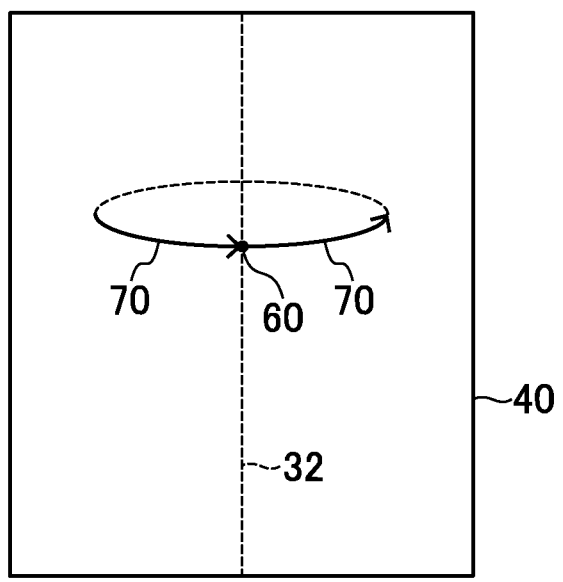
FIG. 7 A diagram illustrating an example of an orbit of a feature point corresponding to the certain point on the item.

FIG. 7 illustrates an example of an orbit of the feature point 60 corresponding to a certain point on the item 30. For example, FIG. 7 shows an orbit 70 of the feature point 60 corresponding to the nose of the beckoning cat. In the example shown in FIG. 3, the shooting device 34 is placed in front of the turntable 20 and slightly above the item 30, and thus, the orbit 70 of the feature point 60 is an elliptical orbit as shown in FIG. 7.

Basically, the feature amount of the feature point 60 corresponding to the nose of the beckoning cat is the same in each of the captured images 40. In other words, the feature points 60 corresponding to the certain point on the item 30 may be specified in the plurality of captured images 40, but basically, the feature amounts of the feature points 60 corresponding to the certain point on the item 30 is the same in each of the plurality of captured image 40.

Then the feature point specifying unit 52 (first determination means) determines whether or not a feature amount of a feature point 60 specified in a first captured image 40 is the same or substantially the same as a feature amount of a feature point 60 specified in a second captured image 40. When a difference between the feature amounts of these feature points 60 is equal to or less than a threshold value, the feature point specifying unit 52 determines the feature amounts of these feature points 60 are substantially the same. When the feature amounts of these feature points 60 are the same or substantially the same, the feature point specifying unit 52 determines that these feature points 60 are feature points 60 corresponding to a certain point on the item 30.

The item 30 rotates about the rotation axis 32 and the Y-axis is an axis corresponding to the rotation axis 32, and thus, the Y-axis coordinate values of the feature points 60 corresponding to the certain point on the item 30 do not differ from each other so much.

As such, the feature point specifying unit 52 (second determination means) determines whether or not a difference between a Y-axis coordinate value of a feature point 60 specified in a first captured image 40 and a Y-axis coordinate value of a feature point 60 specified in a second captured image 40 is a threshold value or more. If the difference between the Y-axis coordinate values of these feature points 60 is the threshold value or more, the feature point specifying unit 52 determines that these feature points 60 are not feature points 60 corresponding to a certain point on the item 30, even though the feature amounts of these feature points 60 are the same or substantially the same.

Further, when a plurality of feature points 60 respectively corresponding to certain points on the item 30 are specified in a first captured image 40 and a second captured image 40, change amounts of X-axis coordinate values of each of the plurality of feature points 60 are substantially the same, and are not significantly different from one another.

Figure 8:
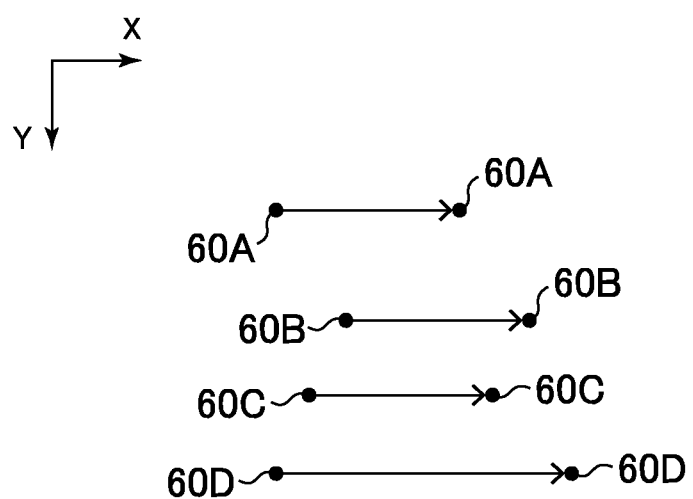
FIG. 8 A diagram illustrating an example of feature points specified in one captured image and another captured image.

As such, as shown in FIG. 8, for example, in a case where a feature point 60A having the same or substantially the same feature amount in both of a first captured image 40 and a second captured image 40, a feature point 60B having the same or substantially the same feature amount in both of the first captured image 40 and the second captured image 40, a feature point 60C having the same or substantially the same feature amount in both of the first captured image 40 and the second captured image 40, and a feature point 60D having the same or substantially the same feature amount in both of the first captured image 40 and the second captured image 40 are specified, the feature point specifying unit 52 (comparing means) compares a change amount of the X-axis coordinate value of the feature point 60D with change amounts of X-axis coordinate values of other feature points 60A-60C.

In the example shown in FIG. 8, the change amounts of the X-axis coordinate values of the feature points 60A-60C are substantially the same, and the change amount of the X-axis coordinate value of the feature point 60D is greater than those of feature points 60A-60C. As described above, when the change amount of the X-axis coordinate value of the feature point 60D is largely different from the change amounts of the X-axis coordinate values of the feature points 60A-60C like this, the feature point specifying unit 52 determines that the feature point 60D is not a feature point 60 corresponding to the certain point in the item 30. In other words, the feature point specifying unit 52 determines that the feature point 60D, which has an absolute value of deviation of the change amount of the X-axis coordinate value greater than the threshold value, is not a feature point 60 corresponding to the certain point in the item 30.

The rotation angle information obtaining unit 56 will be discussed. The rotation angle information obtaining unit 56 obtains rotation angle information on a rotation angle of an object between the point of time when a first captured image 40 is shot and the point of time when a second captured image 40 is shot, based on the position information obtained by the position information obtaining unit 54.

"Rotation angle information" may be, for example, numerical information indicating a rotation angle itself, or numerical information which does not indicate a rotation angle itself but which is in proportion to a rotation angle. In other words, "rotation angle information" may be numerical information directly indicating a size of a rotation angle, or numerical information indirectly indicating a size of a rotation angle.

Figure 9:
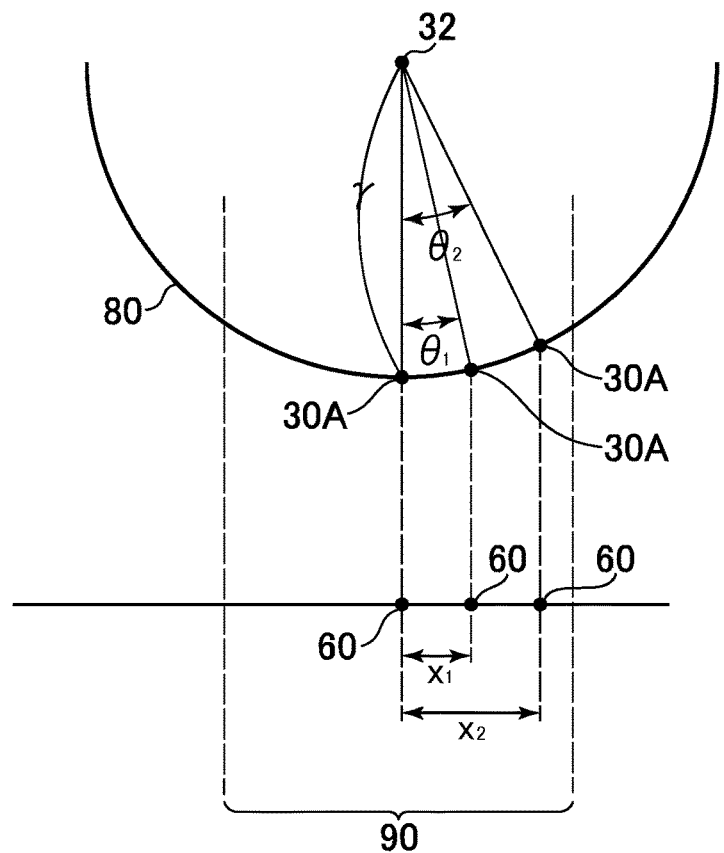
FIG. 9 A diagram for explaining a method for obtaining rotation angle information.

FIG. 9 is a diagram for explaining a method for obtaining rotation angle information and a relationship between a rotation angle of the item 30 and changes in X-coordinate values of a feature point 60. FIG. 9 illustrates the item 30 placed on the turntable 20, viewed from right above.

When the item 30 rotates around the rotation axis 32, an orbit 80 of a point 30A on the item 30 is a circular orbit centered on the rotation axis 32. In the following, the radius of the circular orbit is written as "r."

For example, in a case where the item 30 rotates only by a rotation angle $\theta_1$, a change amount $x_1$ of the X-axis coordinate value of the feature point 60 corresponding to the point 30A on the item 30 is represented by a below equation (1). That is, $x_1$ is a value obtained by multiplying r by sin $\theta_1$. Similarly, in a case where the item 30 rotates only by a rotation angle $\theta_2$, a change amount $x_2$ of the X-axis coordinate value of the feature point 60 corresponding to the point 30A on the item 30 is represented by a below equation (2). That is, $x_2$ is a value obtained by multiplying r by sin $\theta_2$.

$$x_1 = r \sin \theta_1 \qquad (1)$$

$$x_2 = r \sin \theta_2 \qquad (2)$$

Figure 10:
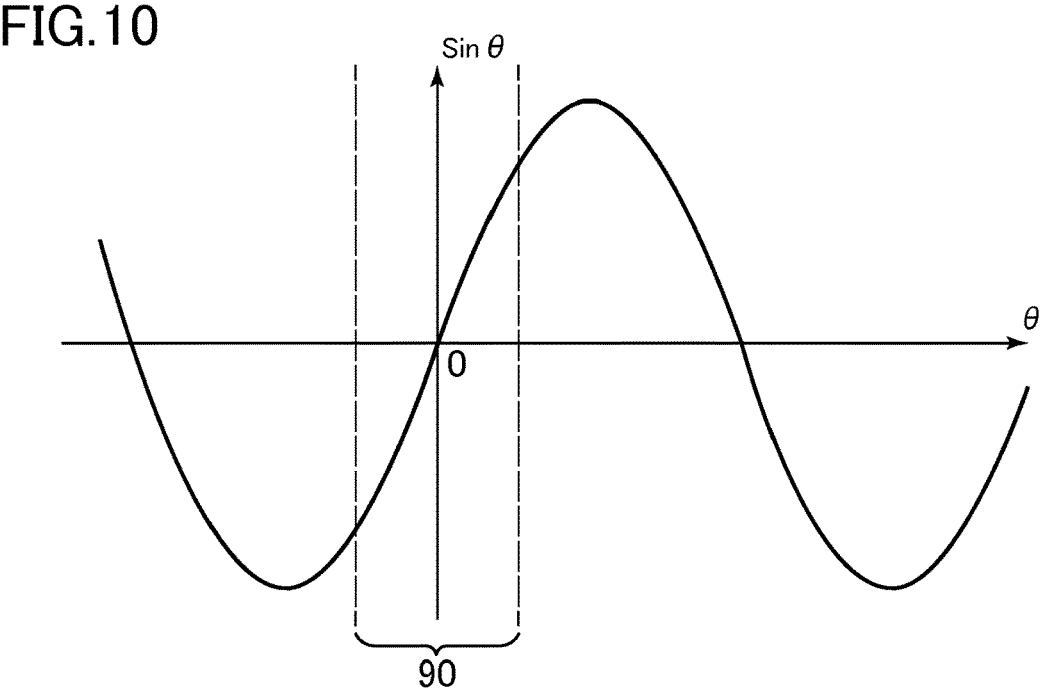
FIG. 10 A diagram illustrating the Sin function.

The Sin function is as what is shown in FIG. 10, and then the Sin function can be linearly approximated at a nearby area 90 where the angle θ is zero or close to zero. As such, the above equations (1) and (2) can be approximated as below equations (3) and (4) using a proportional constant a. Further, based on equations (3) and (4), a relationship between $x_1$, $x_2$, $\theta_1$, and $\theta_2$ is represented by a below equation (5).

$$x_1 = r\sin\theta_1 \cong ar\theta_1 \qquad (3)$$

$$x_2 = r\sin\theta_2 \cong ar\theta_2 \qquad (4)$$

$$\frac{x_2}{x_1} = \frac{\theta_2}{\theta_1} \qquad (5)$$

Further, $x_2$ and $\theta_2$ can be represented by below equations (6) and (7).

$$x_2 = x_1 + \Delta x \qquad (6)$$

$$\theta_2 = \theta_1 + \Delta \theta \qquad (7)$$

The above equation (5) can be modified as below equation (8). The below equation (8) can be arranged as below equation (9). Further, based on the above equation (3), the below equation (9) can be modified as below equation (10). Then, below equation (11) can be obtained based on the below equation (10).

$$\frac{x_1 + \Delta x}{x_1} = \frac{\theta_1 + \Delta \theta}{\theta_1} \qquad (8)$$

$$\frac{\Delta x}{x_1} = \frac{\Delta \theta}{\theta_1} \qquad (9)$$

$$\frac{\Delta \theta}{\theta_1} = \frac{\Delta x}{ar\theta_1} \qquad (10)$$

$$\Delta \theta = \frac{\Delta x}{ar} \qquad (11)$$

The above equation (11) indicates that a change of the angle (Δθ) is proportional to a change of the X-axis coordinate value (Δx). Accordingly, the rotation angle (Δθ) of when the item 30 rotates has a proportional relation with the change amount (Δx) of the X-axis coordinate value of the feature point 60 corresponding to the point 30A on the item 30.

Now, a radius r in the equation (11) basically varies at each point on the item 30. However, in a case where the item 30 has a cylindrical shape, the above radius r does not vary at each point on the item 30 and substantially the same. As such, assuming that a shape of the item 30 is cylindrical, the radius r in the equation (11) may be ignored, and thus, the change amount of the X-axis coordinate value of the feature point 60 may be used as a value indicating a size of a rotation angle of the item 30.

In view of the above, functions of the rotation angle information obtaining unit 56 will be discussed in detail.

Figure 11:
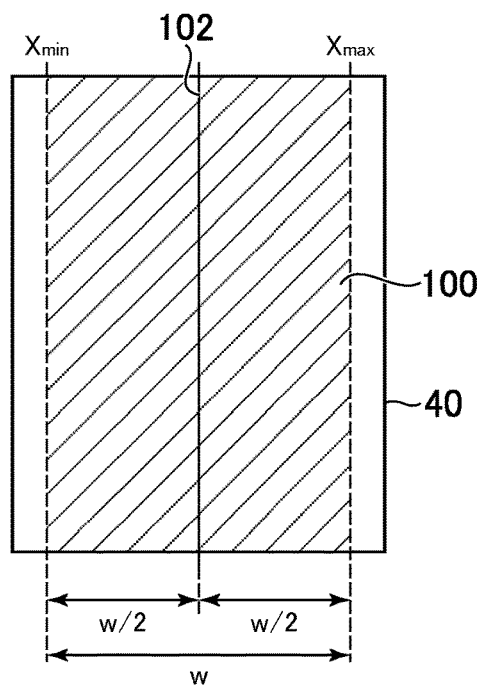
FIG. 11 A diagram for explaining a method for setting an observation area.
Figure 12:
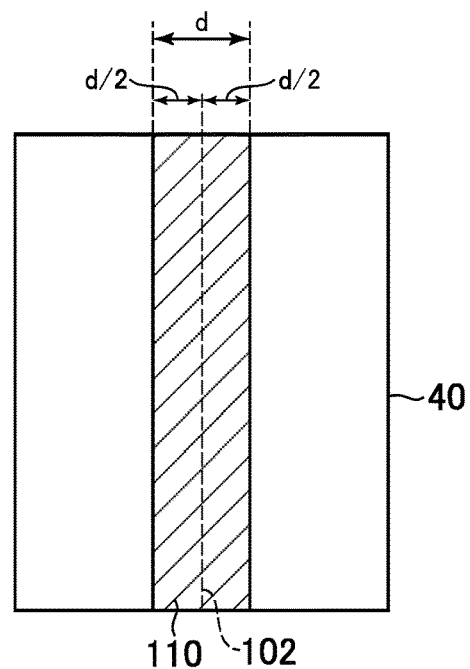
FIG. 12 A diagram for explaining a method for setting an observation area.

The rotation angle information obtaining unit 56 sets an observation area in a captured image 40 based on the position of the rotation axis 32 in the captured image 40. The observation area is an area corresponding to the nearby area 90 shown in FIG. 10. FIGS. 11 and 12 are diagrams for explaining a method for setting the observation area.

Firstly, the rotation angle information obtaining unit 56 extracts a feature point 60 having the minimum X-axis coordinate value and a feature point 60 having the maximum X-axis coordinate value from among feature points 60 in all of the captured images 40. In this case, a feature point 60 included in the background area is ignored.

In FIG. 11, the X-axis coordinate value of the feature point 60 having the minimum X-axis coordinate value is written as "$X_{min}$", and the X-axis coordinate value of the feature point 60 having the maximum X-axis coordinate value is written as "$X_{max}$." The rotation angle information obtaining unit 56 assumes that an area where a X-axis coordinate value satisfies $X_{min} \leq x \leq X_{max}$ as an area 100 in which a feature point 60 can exist (hereinafter referred to as an "existence area").

Subsequently, the rotation angle information obtaining unit 56 obtains a position of the rotation axis 32 in the captured image 40 based on the existence area 100. As shown in FIG. 11, for example, the rotation angle information obtaining unit 56 assumes a straight line 102 that equally divides the existence area 100 toward right and left as a straight line corresponding to the rotation axis 32. In other words, the rotation angle information obtaining unit 56 assumes the straight line 102, which passes through the intermediate value of the $X_{min}$ and the $X_{max}$, $((X_{min}+X_{max})/2)$, and is parallel to the Y-axis, as a straight line corresponding to the rotation axis 32.

The rotation angle information obtaining unit 56 may obtain an object area, in which an object (item 30) is presented, in each of all the captured images 40. Then, the rotation angle information obtaining unit 56 may assume a straight line that equally divides a sum-set area of those object areas toward right and left as a straight line corresponding to the rotation axis 32.

The rotation angle information obtaining unit 56 sets an observation area based on the straight line 102 obtained as described above. As shown in FIG. 12, for example, the rotation angle information obtaining unit 56 sets a rectangular area with the straight line 102 passing through the center and having the width d as the observation area 110. In this case, the width d is set as a value smaller than a width w of the existence area 100.

As described later, the rotation angle information obtaining unit 56 uses only a feature point 60 included in the observation area 110 in order to obtain rotation angle information. For this reason, if a value of the width d is too small, a number of the feature points 60 included in the observation area 110 gets small, and thus an accuracy of the rotation angle information may possibly be reduced. On the other hand, if a value of the width d is too big, the observation area 110 may not possibly correspond to the nearby area 90 in FIG. 10. In this case, the premise that a linear approximation of the Sin function is possible is not satisfied, and as a result, the accuracy of the rotation angle information may possibly be reduced. It is preferable, to set the value of width d as, for example, about one third of the value of width (w) of the existence area 100.

In a case where the feature point 60 corresponding to the certain point on the item 30 is specified in the observation areas 110 in both of a first captured image 40 and a second captured image 40, the rotation angle information obtaining unit 56 obtains position difference information regarding a difference between a position of a feature point 60 in the first captured image 40 and a position of a feature point 60 in the second captured image 40.

For example, the rotation angle information obtaining unit 56 obtains information regarding differences in X-axis coordinate values as the above position difference information. As described above, the X-axis is an axis perpendicular to the Y-axis corresponding to the rotation axis 32.

The rotation angle information obtaining unit 56 obtains rotation angle information based on the above position difference information.

For example, when a plurality of feature points 60 respectively corresponding to certain points on the item 30 are specified in the observation areas 110 in both of a first captured image 40 and a second captured image 40, the rotation angle information obtaining unit 56 calculates a change amount of X-axis coordinate values between the first captured image 40 and the second captured image 40 for each of the feature points 60. Subsequently, the rotation angle information obtaining unit 56 calculates statistics (e.g., average value) of the change amounts of the respective feature points 60. In this case, such calculated values are used as the rotation angle information.

Alternatively, the rotation angle information obtaining unit 56 may calculate center of gravity positions of the above feature points 60 in the first captured image 40. Further, the rotation angle information obtaining unit 56 may calculate center of gravity positions of the above feature points 60 in the second captured image 40. Then, the rotation angle information obtaining unit 56 may calculate differences in X-axis coordinate values between those center of gravity positions. In this case, such calculated values are used as the rotation angle information.

The values described above correspond to numerical values representing sizes of rotation angles, but are not numerical values representing the rotation angles themselves. For this reason, in the following, such numerical values are referred to as "pseudo-rotation angle" for convenience.

The moving image data generating unit 58 will be discussed. The moving image data generating unit 58 generates moving image data by selecting, from among the captured images 40, each frame images 42 of the moving image data showing how the object rotates based on the position information obtained by the position information obtaining unit 54.

For example, the moving image data generating unit 58 selects, from among the captured images 40, frame images 42 of the moving image data showing how the item 30 rotates based on the rotation angle information obtained by the rotation angle information obtaining unit 56 for each of the captured images 40 included in the captured image data.

Specifically, the moving image data generating unit 58 selects each frame images 42 so that rotation angles of the item 30 between the frame images 42 are substantially the same.

FIG. 13 is a diagram for explaining an example of a method for selecting frame images 42. In FIG. 13, for example, $\Delta\theta_{1,2}$ represents a pseudo-rotation angle between a captured image [1] and a captured image [2]. That is, $\Delta\theta_{1,2}$ represents a pseudo-rotation angle of the item 30 between the point of time when the captured image [1] is shot and the point of time when the captured image [2] is shot. For example, in a case where a plurality of feature points 60 respectively corresponding to certain points on the item 30 are specified in the observation areas 110 in both of the captured image [1] and the captured image [2], an average value of the change amounts of the X-axis coordinate values of the feature points 60 between the captured image [1] and the captured image [2] corresponds to $\Delta\theta_{1,2}$.

Firstly, the moving image data generating unit 58 selects a frame image [1]. For example, the moving image data generating unit 58 selects the captured image [1] as the frame image [1].

Subsequently, the moving image data generating unit 58 selects a frame image [2]. The moving image data generating unit 58 first determines whether or not to select the captured image [2], which follows the captured image [1] selected as the preceding frame image [1], as the frame image [2].

In this case, the moving image data generating unit 58 compares a pseudo-rotation angle $\Delta\theta_{1,2}$ between the captured image [1] and the captured image [2] with a threshold value $\theta_T$. In other words, the moving image data generating unit 58 determines whether the pseudo-rotation angle $\Delta\theta_{1,2}$ between the captured image [1] and the captured image [2] is equal to or more than the threshold value $\theta_T$. The threshold value $\theta_T$ is a proper pseudo-rotation angle as a pseudo-rotation angle between the frame images 42, and is determined in advance.

If the pseudo-rotation angle $\Delta\theta_{1,2}$ is equal to or more than the threshold value $\theta_T$, the moving image data generating unit 58 selects the captured image [2] as the frame image [2]. On the other hand, as shown in FIG. 13, if the pseudo-rotation angle $\Delta\theta_{1,2}$ is less than the threshold value $\theta_T$, the moving image data generating unit 58 does not select the captured image [2] as the frame image [2].

If the captured image [2] is not selected as the frame image [2], the moving image data generating unit 58 determines whether or not to select the following captured image [3] as the frame image [2].

In this case, the moving image data generating unit 58 compares a cumulative pseudo-rotation angle between the captured image [1] selected as the preceding frame image [1] and the captured image [3] with the threshold value $\theta_T$. That is, the moving image data generating unit 58 determines whether the sum of the pseudo-rotation angle $\Delta\theta_{1,2}$ between the captured images [1] and [2] and the pseudo-rotation angle $\Delta\theta_{2,3}$ between the captured images [2] and [3] is equal to or more than the threshold value $\theta_T$. In this case, the sum corresponds to a numerical value indicating a size of the rotation angle of the item 30 between the point of time when the captured image [1] is shot and the point of time when the captured image [3] is shot.

If the sum of the pseudo-rotation angles $\Delta\theta_{1,2}$ and $\Delta\theta_{2,3}$ is equal to or more than the threshold value $\theta_T$, the moving image data generating unit 58 selects the captured image [3] as the frame image [2]. On the other hand, as shown in FIG. 13, the sum of the pseudo-rotation angles $\Delta\theta_{1,2}$ and $\Delta\theta_{2,3}$ is less than the threshold value $\theta_T$, the moving image data generating unit 58 does not select the captured image [3] as the frame image [2].

In a case where the captured image [3] is not selected as the frame image [2], the moving image data generating unit 58 determines whether or not to select the following captured image [4] as the frame image [2].

In this case, the moving image data generating unit 58 determines whether the cumulative pseudo-rotation angle between the captured image [1] selected as the preceding frame image [1] and the captured image [4] is equal to or more than the threshold value $\theta_T$. That is, the moving image data generating unit 58 determines whether the sum of the pseudo-rotation angle $\Delta\theta_{1,2}$ between the captured images [1] and [2], the pseudo-rotation angle $\Delta\theta_{2,3}$ between the captured images [2] and [3], and the pseudo-rotation angle $\Delta\theta_{3,4}$ between the captured images [3] and [4] is equal to or more than the threshold value $\theta_T$. In this case, the sum corresponds to a numerical value indicating a size of the rotation angle of the item 30 between the point of time when the captured image [1] is shot and the point of time when the captured image [4] is shot.

As shown in FIG. 13, if the sum of the pseudo-rotation angles $\Delta\theta_{1,2}$, $\Delta\theta_{2,3}$, and $\Delta\theta_{3,4}$ is equal to or more than the threshold value $\theta_T$, the moving image data generating unit 58 selects the captured image [4] as the frame image [2].

After selecting the frame image [2], the moving image data generating unit 58 selects the frame [3]. The moving image data generating unit 58 first determines whether or not to select the captured image [5], which follows the captured image [4] selected as the preceding frame image [2], as the frame image [3].

In this case, the moving image data generating unit 58 determines whether the pseudo-rotation angle $\Delta\theta_{4,5}$ between the captured image [4] and the captured image [5] is equal to or more than the threshold value $\theta_T$. If the pseudo-rotation angle $\Delta\theta_{4,5}$ is equal to or more than the threshold value $\theta_T$, the moving image data generating unit 58 selects the captured image [5] as the frame image [3]. On the other hand, as shown in FIG. 13, if the pseudo-rotation angle $\Delta\theta_{4,5}$ is less than the threshold value $\theta_T$, the moving image data generating unit 58 does not select the captured image [5] as the frame image [3].

If the captured image [5] is not selected as the frame image [3], the moving image data generating unit 58 determines whether or not to select the following captured image [6] as the frame image [3].

In this case, the moving image data generating unit 58 determines whether the cumulative pseudo-rotation angle between the captured image [4] selected as the preceding frame image [2] and the captured image [6] is equal to or more than the threshold value $\theta_T$. That is, the moving image data generating unit 58 determines whether the sum of the pseudo-rotation angle $\Delta\theta_{4,5}$ between the captured images [4] and [5] and the pseudo-rotation angle $\Delta\theta_{5,6}$ between the captured images [5] and [6] is equal to or more than the threshold value $\theta_T$.

As shown in FIG. 13, if the sum of the pseudo-rotation angles $\Delta\theta_{4,5}$ and $\Delta\theta_{5,6}$ is equal to or more than the threshold value $\theta_T$, the moving image data generating unit 58 selects the captured image [6] as the frame image [3].

As described above, if a captured image [i] is selected as a frame image [j], the moving image data generating unit 58 determines whether the cumulative pseudo-rotation angle between the captured image [i] and the captured image [i+1] is equal to or more than the threshold value $\theta_T$ in order to determine whether or not to select the captured image [i+1] as the frame image [j+1].

If the cumulative pseudo-rotation angle is equal to or more than the threshold value $\theta_T$, the moving image data generating unit 58 selects the captured image [i+1] as the frame image [j+1]. On the other hand, if the cumulative pseudo-rotation angle is less than the threshold value $\theta_T$, the moving image data generating unit 58 does not select the captured image [i+1] as the frame image [j+1]. In this case, the moving image data generating unit 58 determines whether the cumulative pseudo-rotation angle between the captured image [i] and the captured image [i+2] is equal to or more than the threshold value $\theta_T$ in order to determine whether or not to select the captured image [i+2] as the frame image [j+1].

In this way, the moving image data generating unit 58 searches for a first captured image 40 having a value of the cumulative pseudo-rotation angle between itself and the captured image [i] equal to or more than the threshold value $\theta_T$. For example, if the cumulative pseudo-rotation angle between the captured image [i] and the captured image [i+k] (k: an integer of 1 or more) is the threshold value $\theta_T$, the moving image data generating unit 58 selects the captured image [i+k] as the frame image [j+1].

As described above, the moving image data generating unit 58 selects each frame image 42 of the moving image data.

A method for selecting the frame images 42 is not limited to the example illustrated in FIG. 13. Other examples of selecting the frame images 42 will be discussed below.

Now, the first example will be discussed. FIG. 14 is a diagram for explaining the first example. Here, a case is assumed in which, after the captured image [i] is selected as the frame image [j], if the captured image [i+1] is not selected as the frame image [j+1], it is determined whether or not to select the captured image [i+k] (k: an integer of 2 or more) as the frame image [j+1].

In this case, in the selecting method shown in FIG. 13, it is configured to determine whether the cumulative pseudo-rotation angle between the captured image [i] selected as the preceding frame image [j] and the captured image [i+k] is equal to or more than the threshold value $\theta_T$. That is, in the selecting method shown in FIG. 13, it is configured to determine whether the cumulative pseudo-rotation angle $\Delta\theta_{i,i+1} + \ldots + \Delta\theta_{i+k-1,i+k}$ between the captured image [i] and the captured image [i+k] is equal to or more than the threshold value $\theta_T$.

On the other hand, in the selecting method shown in FIG. 14, change amounts of the X-axis coordinate values of the feature points 60 corresponding to the certain point on the item 30 are calculated between the captured image [i] and the captured image [i+k], and based on the calculated change amounts, the pseudo-rotation angle $\Delta\theta_{i,i+k}$ between the captured image [i] and the captured image [i+k] is calculated.

That is, for example, in a case where a plurality of feature points 60 respectively corresponding to certain points on the item 30 are specified in the observation areas 110 in both of the captured image [i] and the captured image [i+k], an average value of the change amounts of the X-axis coordinate values of the feature points 60 is calculated as the pseudo-rotation angle $\Delta\theta_{i,i+k}$, and it is determined whether the pseudo-rotation angle $\Delta\theta_{i,i+k}$ is equal to or more than the threshold value $\theta_T$.

The second example will be discussed. Here, a case is also discussed in which, after the captured image [i] is selected as the frame image [j], it is determined whether or not to select the captured image [i+k] as the frame image [j+1].

In this case, it may be determined whether the cumulative pseudo-rotation angle between the captured image [1] selected as the first frame image [1] and the captured image [i+k] (or pseudo-rotation angle $\theta_{1,i+k}$) is equal to or more than $\theta_T*j$. Then, if the cumulative pseudo-rotation angle (or the pseudo-rotation angle $\theta_{1,i+k}$) is equal to or more than $\theta_T*j$, the captured image [i+k] may be selected as the frame image [j+1].

Figure 15:
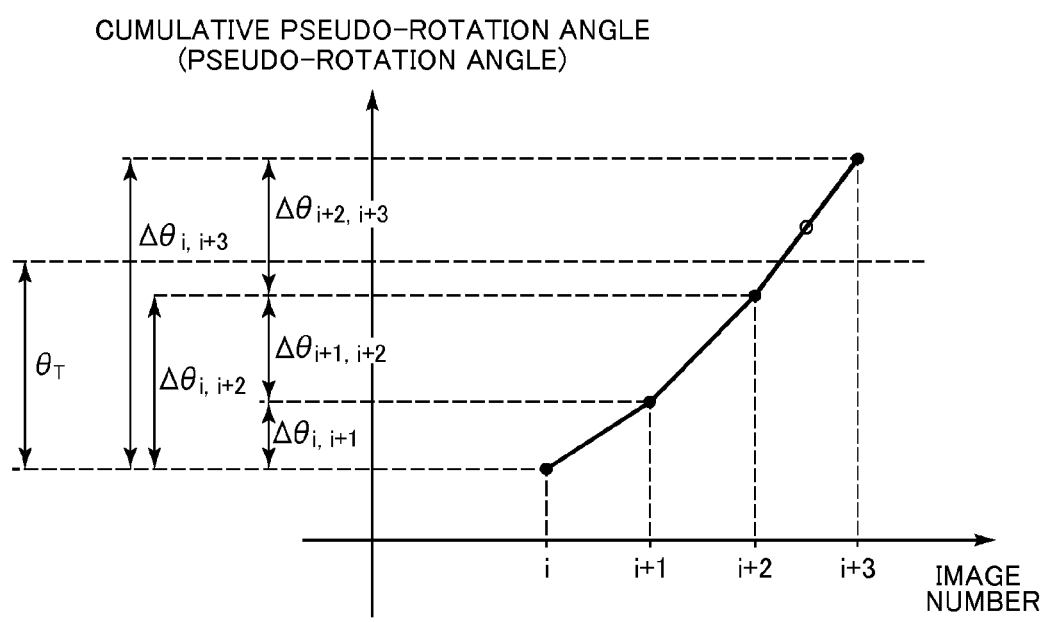
FIG. 15 A diagram for explaining the other example of a method for selecting frame images.

The third example will be discussed. FIG. 15 is a diagram for explaining the third example. Here, a case is assumed in which, after the captured image [i] is selected as the frame image [j], it is determined whether or not to select the captured image [i+3] as the frame image [j+1].

In the selecting method shown in FIG. 13, in a case where the cumulative pseudo-rotation angle between the captured image [i] and the captured image [i+3] is equal to or more than the threshold value $\theta_T$, the captured image [i+3] is selected as the frame image [j+1]. Further, in the selecting method shown in FIG. 14, in a case where the pseudo-rotation angle $\theta_{i,i+3}$ between the captured image [i] and the captured image [i+3] is equal to or more than the threshold value $\theta_T$, the captured image [i+3] is selected as the frame image [j+1]. Also in the second example, in a case where the cumulative pseudo-rotation angle between the captured image [1] and the captured image [i+3] (or pseudo-rotation angle $\theta_{1,i+3}$) is equal to or more than $\theta_T*j$, the captured image [i+3] is selected as the frame image [j+1].

However, in this case, either one of the captured image [i+3] and the captured image [i+2] immediately before the captured image [i+3] may be selectively selected as the frame image [j+1].

For example, in the case of the selecting method shown in FIG. 13, in the above described case, the moving image data generating unit 58 determines which one of the cumulative pseudo-rotation angle $\Delta\theta_{i,i+1} + \Delta\theta_{i+1,i+2}$ between the captured image [i] and the captured image [i+2] and the cumulative pseudo-rotation angle $\Delta\theta_{i,i+1} + \Delta\theta_{i+1,i+2} + \Delta\theta_{i+2,i+3}$ between the captured image [i] and the captured image [i+3] is closer to the threshold value $\theta_T$. The moving image data generating unit 58 determines, for example, whether the intermediate value of these cumulative pseudo-rotation angles is less than the threshold value $\theta_T$. In other words, the moving image data generating unit 58 determines whether the intermediate value of the cumulative pseudo-rotation angles, $((\Delta\theta_{i,i+1} + \Delta\theta_{i+1,i+2}) + (\Delta\theta_{i,i+1} + \Delta\theta_{i+1,i+2} + \Delta\theta_{i+2,i+3}))/2$, is less than the threshold value $\theta_T$.

As shown in FIG. 15, if the intermediate value is greater than the threshold value $\theta_T$, the cumulative pseudo-rotation angle between the captured image [i] and the captured image [i+2] is closer to the threshold value $\theta_T$, and thus the moving image data generating unit 58 selects the captured image [i+2] as the frame image [j+1]. On the other hand, if the intermediate value is less than the threshold value $\theta_T$, the cumulative pseudo-rotation angle between the captured image [i] and the captured image [i+3] is closer to the threshold value $\theta_T$, and thus the moving image data generating unit 58 selects the captured image [i+3] as the frame image [j+1].

Further, in the selecting method shown in FIG. 14, the moving image data generating unit 58 determines which one of the pseudo-rotation angle between the captured image [i] and the captured image [i+2], $\theta_{i,i+2}$, and the pseudo-rotation angle between the captured image [i] and the captured image [i+3], $\theta_{i,i+3}$, is closer to the threshold value $\theta_T$. For example, the moving image data generating unit 58 determines whether the intermediate value of these pseudo-rotation angles, $(\Delta\theta_{i,i+2} + \Delta\theta_{i,i+3})/2$, is less than the threshold value $\theta_T$.

As shown in FIG. 15, if the intermediate value is greater than the threshold value $\theta_T$, the pseudo-rotation angle between the captured image [i] and the captured image [i+2], $\theta_{i,i+2}$, is closer to the threshold value $\theta_T$, and thus the moving image data generating unit 58 selects the captured image [i+2] as the frame image [j+1]. On the other hand, if the intermediate value is less than the threshold value $\theta_T$, the pseudo-rotation angle between the captured image [i] and the captured image [i+3], $\theta_{i,i+3}$, is closer to the threshold value $\theta_T$, and thus the moving image data generating unit 58 selects the captured image [i+3] as the frame image [j+1].

In this way, the item 30 rotates more smoothly in the moving image data. If the intermediate value is equal to the threshold value $\theta_T$, the moving image data generating unit 58 may select either one of the captured image [i+2] and the captured image [i+3] as the frame image [j+1].

Figure 16:
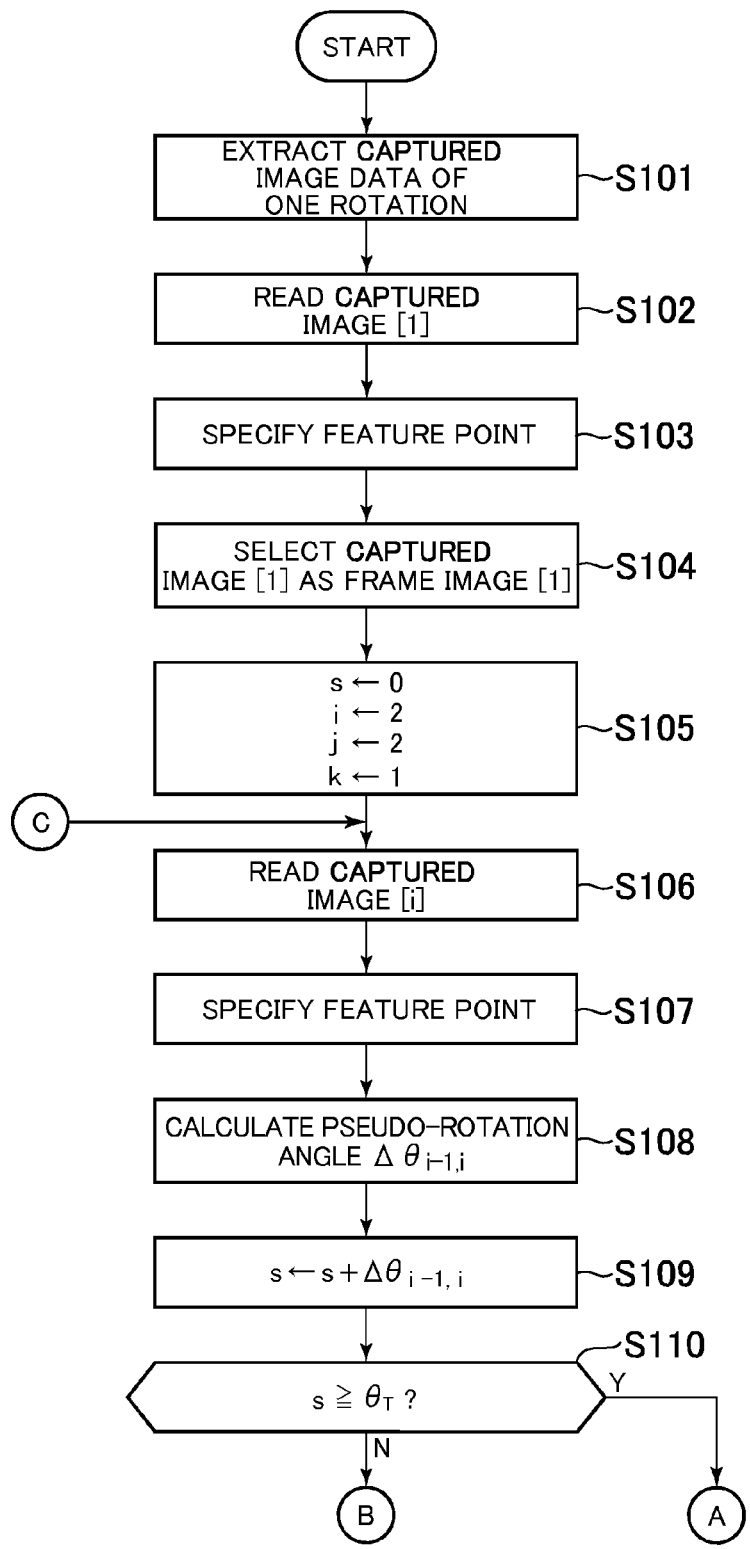
FIG. 16 A flow chart showing an example of processing executed in the image processing device.
Figure 17:
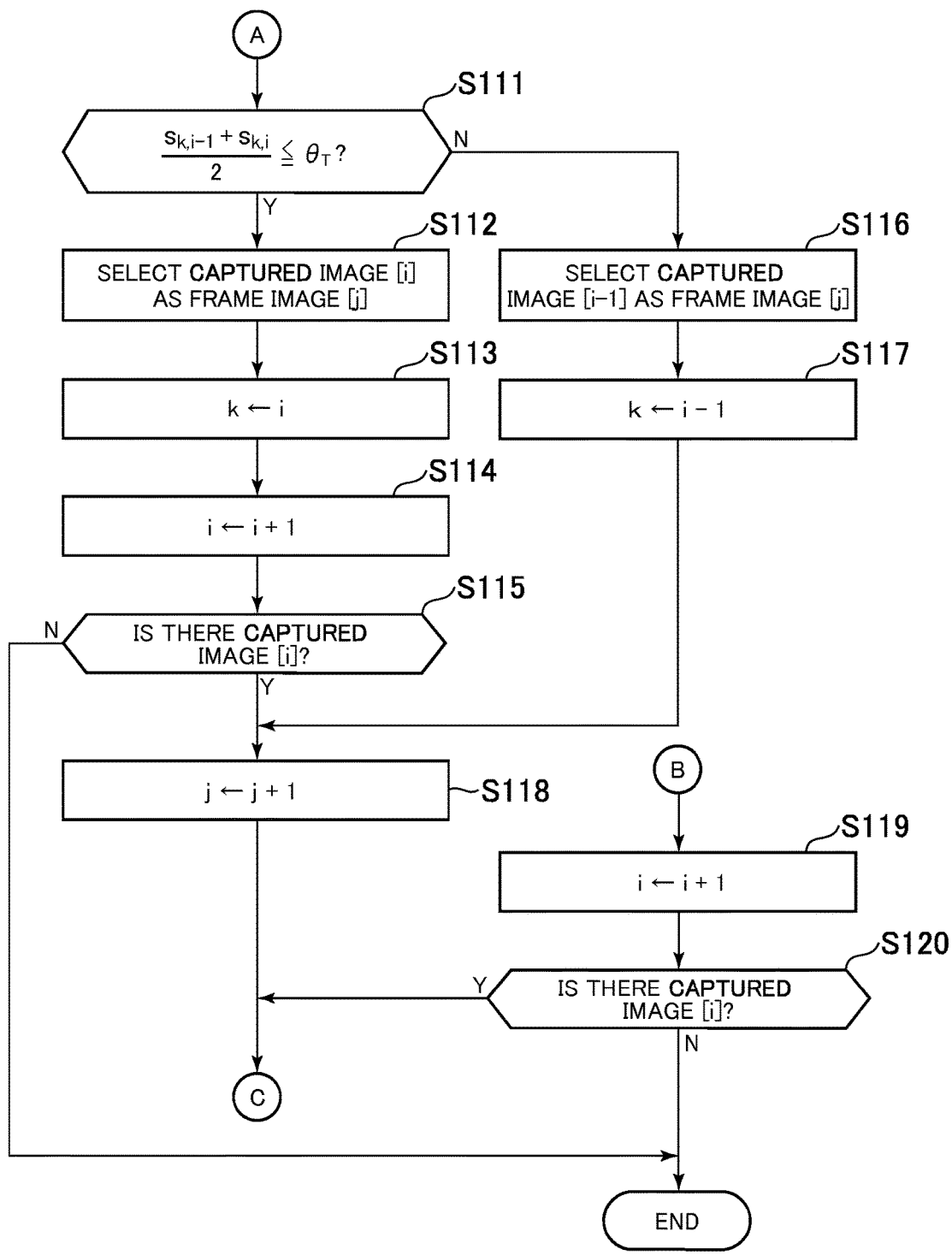
FIG. 17 A flow chart showing an example of processing executed in the image processing device.

Next, the processing executed in the image processing device 10 to implement the functional blocks shown in FIG. 5 will be discussed. FIGS. 16 and 17 are flow charts showing an example of the processing executed in the image processing device 10 in order to generate moving image data of the item 30 rotating once based on captured data. The processing shown in FIGS. 16 and 17 corresponds to a selecting methods made by combining the selection methods shown in FIGS. 13 and 15. The control unit 11 executes the processing shown in FIGS. 16 and 17 according to a program, to thereby operate as the functional blocks shown in FIG. 5.

Figure 18:
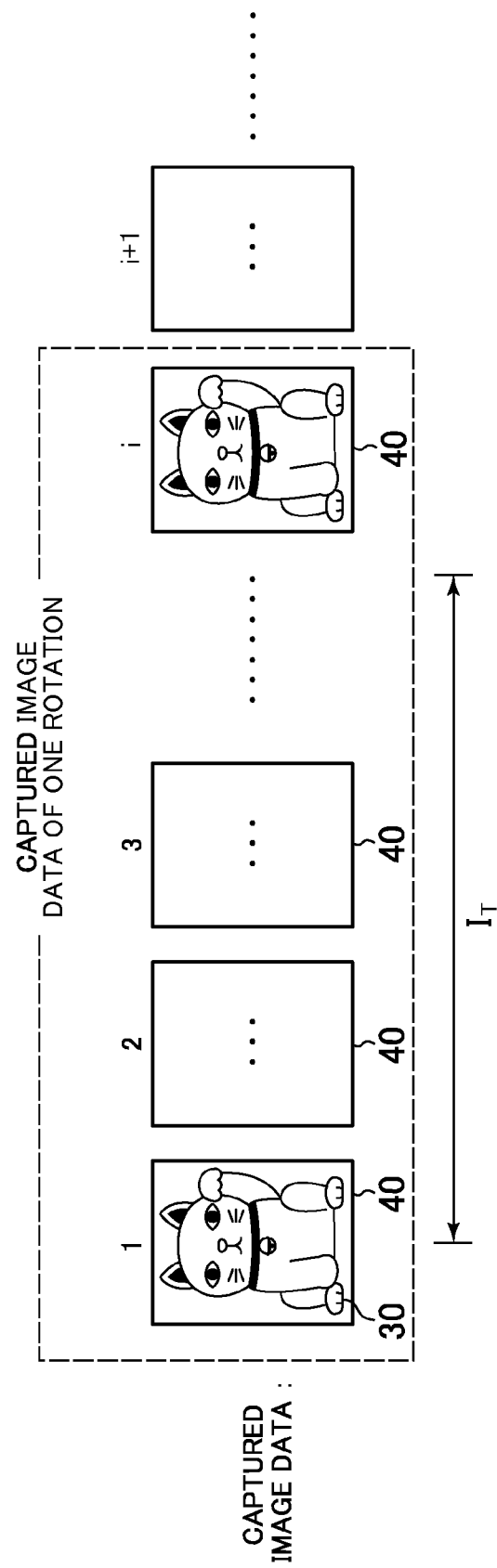
FIG. 18 A diagram for explaining an outline of processing executed in the image processing device.
Figure 19:
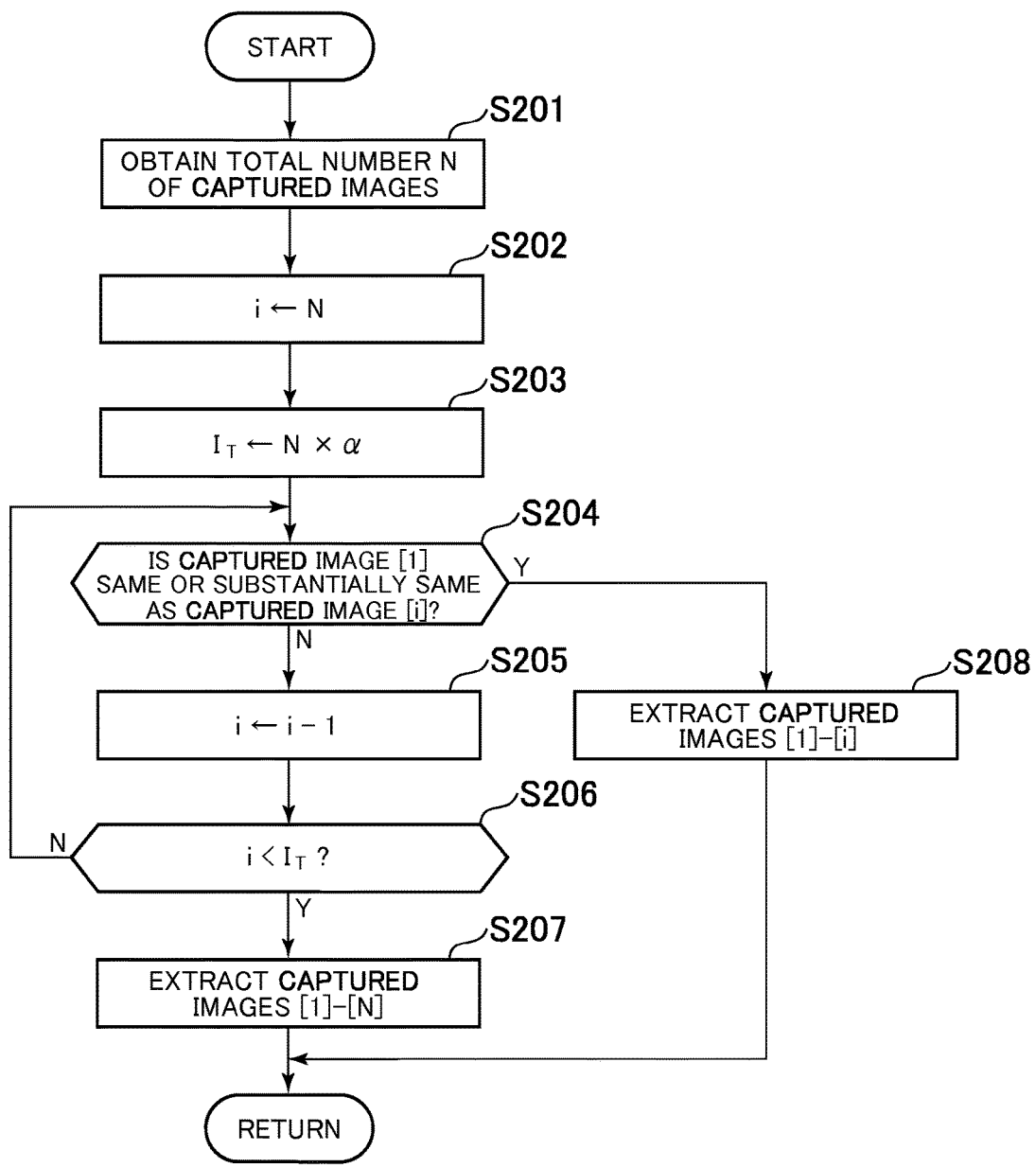
FIG. 19 A flow chart showing details of processing executed in the image processing device.

As shown in FIG. 16, the control unit 11 extracts captured image data corresponding to one rotation of the item 30 from the captured image data in order to generate moving image data of one rotation of the item 30 (S101). FIG. 18 is a diagram illustrating an outline of the processing of step S101, and FIG. 19 is a flow chart showing details of the processing of step S101.

As shown in FIG. 18, the control unit 11 searches for a captured image 40 at the point of time when the item 30 completes one rotation from among the captured images 40 included in the captured image data. The captured image 40 at the point of time when the item 30 completes one rotation is supposed to be an image that is the same or substantially the same as the captured image 40 immediately before the item 30 starts to rotate (hereinafter "reference captured image") and is shot after a certain period of time has passed since the reference captured image is shot. As such, if the captured image [i] satisfies both of the following conditions (A) and (B), it can be assumed that the captured image [i] corresponds to the captured image 40 at the point of time when the item 30 completes one rotation. For example, the first captured image 40 from among the captured images 40 included in the captured image data is set as "reference captured image."

(A) The reference captured image is the same or substantially the same as the captured image [i]. In other words, the similarity between the reference captured image and the captured image [i] is extremely high.

(B) The point of time when the reference captured image is shot and the point of time when the captured image [i] is shot are separated from each other for a predetermined period of time or more. In other words, a difference between the image number of the reference captured image and the image number of the captured image [i] is equal to or more than the threshold value (IT).

"Predetermined period of time" and "threshold value (IT)" in the above condition (B) are determined in view of an average time required for the item 30 to complete one rotation.

As described above, the control unit 11 searches for a captured image 40 that satisfies both of the conditions (A) and (B) from among the captured image data, to thereby find out a captured image 40 at the point of time when the item 30 completes one rotation. The control unit 11 then extracts images, starting from the reference captured image to such a captured image 40, as captured image data of one rotation of the item 30. In the processing shown in FIG. 19, a captured image 40 that satisfies both of the conditions (A) and (B) is searched in the order from the last captured image 40 to the first captured image 40. Here, the first captured image 40 is set as the reference captured image.

In the processing shown in FIG. 19, the control unit 11 firstly obtains the total number N of captured images 40 included in the captured image data (S201). The control unit 11 then substitutes the total number N for a variable i (S202). Further, the control unit 11 set a value obtained by multiplying the total number N by a predetermined coefficient α (α: 0<α<1, e.g., ⅓) as a threshold value $I_T$ (S203). The control unit 11 may set a predetermined fixed value as a threshold value $I_T$.

Subsequently, the control unit 11 determines whether the captured image [1] and the captured image [i] are the same or substantially the same with each other (S204). That is, the control unit 11 determines whether the similarity between the captured image [1] and the captured image [i] is extremely high.

For example, in a case where a plurality of feature points 60 respectively corresponding to certain points on the item 30 are specified in both of the captured image [1] and the captured image [i], the control unit 11 determines whether the number of such feature points 60 is greater than a predetermined threshold value.

If the number is greater than the threshold value, the control unit 11 generates a subtraction image between the captured image [1] and the captured image [i], and calculates a total value of pixel values of the subtraction image. In this case, when the total value is smaller, the similarity between the captured image [1] and the captured image [i] is higher. As such, the control unit 11 determines whether the total value is less than the predetermined threshold value.

If the total value is less than the threshold value, the control unit 11 determines that captured image [1] and the captured image [i] are the same or substantially the same. On the other hand, when the number is less than the threshold value or when the total value is equal to or more than the threshold value, the control unit 11 determines that the captured image [1] and the captured image [i] are not the same or substantially the same.

In the determining method as described above, for example, a subtraction image is generated only when the above number is greater than the threshold value, and, as a result, the processing load can be reduced. However, the method for determining whether the captured image [1] and the captured image [i] are the same or substantially the same is not limited to the above method. In the above described method, it is configured to consider the number of feature points 60, but it may be configured not to consider the number of feature points 60. Alternatively, a known method other than the above described method may also be applied.

If the captured image [1] and the captured image [i] are not the same or substantially the same (S204: N), the control unit 11 subtracts 1 from the value of variable i (S205), and determines whether the value of variable i is less than the threshold value $I_T$ (S206). If the value of variable i is not less than the threshold value $I_T$ (S206: N), the control unit 11 executes step S204.

On the other hand, if the captured image [1] and the captured image [i] are the same or substantially the same (S204: Y), the control unit 11 extracts captured images [1] to [i] as captured image data of one rotation (S208). That is, the control unit 11 uses the captured images [1] to [i] in the processing described later (S102-S120). In this case, captured images 40 from and after the captured image [i+1] are removed.

In step S206, in a case where it is determined that the value of variable i is less than the threshold value $I_T$, the control unit 11 extracts the captured images [1] to [N] (S207). The case where it is determined that the value of variable i is less than the threshold value $I_T$ in step S206 is a case where there is no captured image 40 that satisfies both of the conditions (A) and (B). In this case, the control unit 11 uses all of the captured images 40 included in the captured image data in the processing described later (S102-S120).

Instead of executing steps S204-S208, a captured image 40, the similarity between which and the captured image [1] is the highest among the captured images $[I_T]$ to [N], may be searched. Then, the captured images, starting from the first captured image 40 to the captured image 40 that has been found, may be extracted as data of one rotation.

As shown in FIG. 16, after step S101 is executed, the control unit 11 reads the captured image [1] (S102), and specifies feature points 60 in the captured image [1] (S103). Further, the control unit 11 selects the captured image [1] as the frame image [1] (S104).

Subsequently, the control unit 11 initializes the variable s to 0, the variables i and j to 2, and the variable k to 1 (S105). The variable s is used to calculate a cumulative pseudo-rotation angle. The variable i represents an image number of a captured image 40 to be processed, and the variable j represents a frame number of a frame image 42 to be selected. The variable k represents an image number of the captured image 40 selected as the frame image [j−1].

After step S105 is executed, the control unit 11 reads the captured image [i] (S106), and specifies feature points 60 in the captured image [i] (S107). A result of the specification in step S107 is stored in the storage unit 12.

After step S107 is executed, the control unit 11 calculates the pseudo-rotation angle $\Delta\theta_{i-1,i}$ between the captured image [i−1] and the captured image [i] (S108), and adds the pseudo-rotation angle $\Delta\theta_{i-1,i}$ to the variable s (S109). The control unit 11 then determines whether the variable s is equal to or more than the threshold value $\theta_T$ (S110).

If the variable s is not equal to or more than the threshold value $\theta_T$ (S110: N), as shown in FIG. 17, the control unit 11 adds 1 to the variable i (S119), and determines whether there is a captured image [i] (S120). If there is a captured image [i] (S120: Y), the control unit 11 executes step S106.

On the other hand, if the variable s is equal to or more than the threshold value $\theta_T$ (S110: Y), as shown in FIG. 17, the control unit 11 calculates an intermediate value, $(s_{k,i-1}+s_{k,i})/2$, of the cumulative pseudo-rotation angle between the captured image [k] selected as the frame image [j] and the captured image [i−1] and the cumulative pseudo-rotation angle $s_{k,i}$ between the captured image [k] and the captured image [i], and determines whether the intermediate value is equal to or less than the threshold value $\theta_T$ (S111).

If the intermediate value is equal to or less than the threshold value $\theta_T$ (S111: Y), the control unit 11 selects the captured image [i] as the frame image [j] (S112). In this case, the control unit 11 substitute the value of variable i into the variable k (S113), and adds 1 to the variable i (S114). The control unit 11 then determines whether there is a captured image [i] (S115). If there is a captured image [i] (S115: Y), the control unit 11 adds 1 to the variable j (S118), and executes step S106.

On the other hand, if the intermediate value is greater than the threshold value $\theta_T$ (S111: N), the control unit 11 selects the captured image [i−1] as the frame image [j] (S116). In this case, the control unit 11 substitutes the value, which is obtained by subtracting 1 from the value of variable i, into the variable k (S117). The control unit 11 then adds 1 to the variable j (S118), and executes step S106.

If it is determined that there is no captured image [i] in step S115 or S120, the control unit 11 terminates the processing. In this case, moving image data including the frame images [1] to [j] is generated as moving image data that shows the item 30 that rotates once.

The processing executed in the image processing device 10 is not limited to the processing shown in FIGS. 16 and 17.

For example, steps S111, S116, and S117 in FIG. 17 may be removed. That is, it may be configured that if it is determined that the variable s is equal to or more than the threshold value $\theta_T$ in step S110, steps S112 to S115 are always executed. In this case, the selecting method shown in FIG. 13 is executed.

Moreover, for example, instead of executing steps S108 and S109 in FIG. 16, the control unit 11 may calculate a pseudo-rotation angle between the captured image [k] and the captured image [i], $\theta_{k,i}$. And in step S110, it may be determined whether the pseudo-rotation angle $\theta_{k,i}$ is equal to or more than the threshold value $\theta_T$. In this case, the selecting method shown in FIG. 14 is executed.

Figure 20:
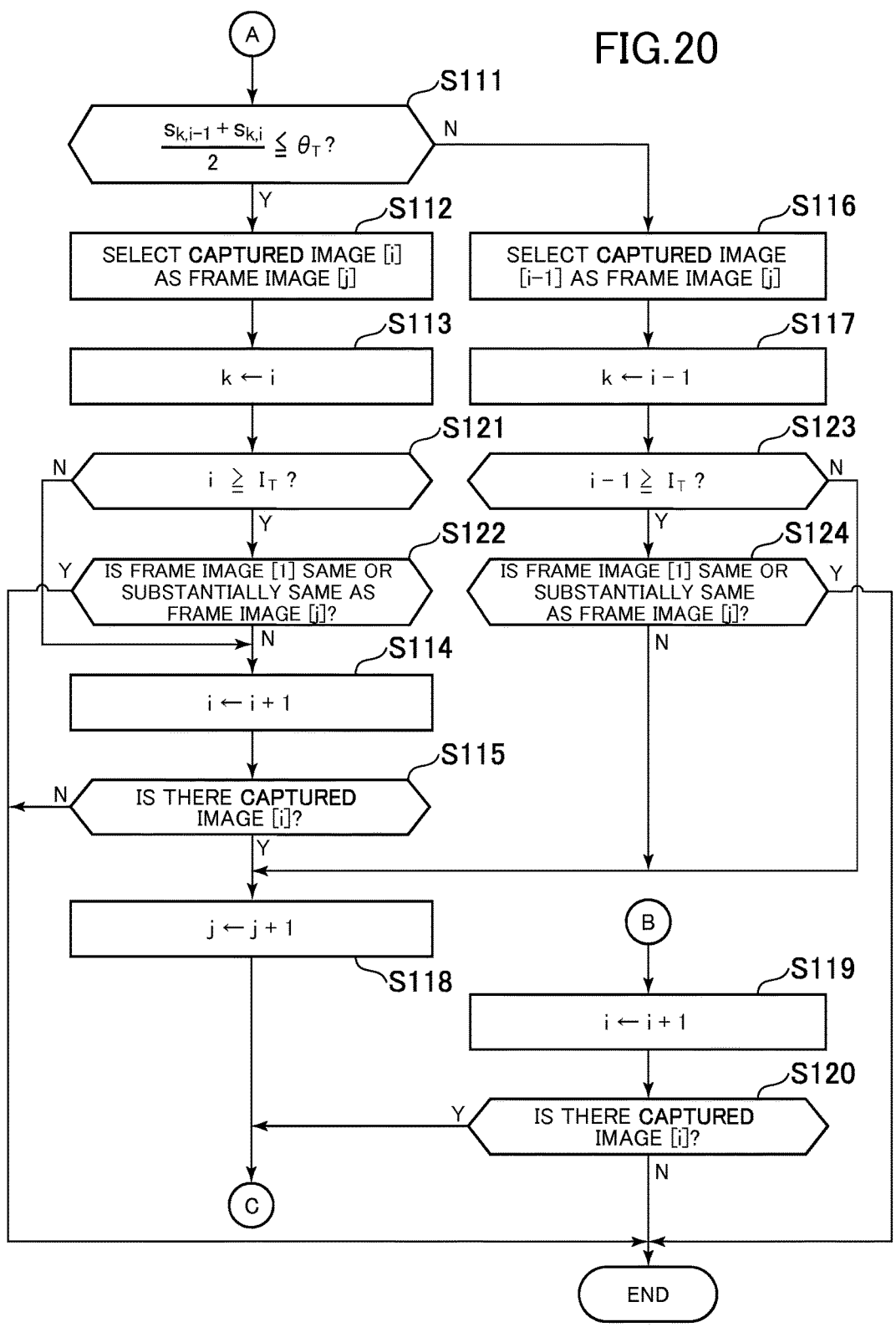
FIG. 20 A flow chart showing another example of processing executed in the image processing device.

Alternatively, for example, step S101 in FIG. 16 may be skipped and the processing shown in FIG. 20 may be executed instead of the processing shown in FIG. 17. The processing shown in FIG. 20 is different from the processing shown in FIG. 17 at the point that it includes steps S121 to S124.

In the processing shown in FIG. 20, after steps S113 and S117 are executed, the control unit 11 executes processing for determining whether the captured image 40 selected as the frame image [j] corresponds to the captured image 40 at the point of time when the item 30 has completed one rotation (steps S121-S124).

That is, after step S113 is executed, the control unit 11 determines whether the value of variable i is equal to or more than the threshold value $I_T$ (S121). The threshold value $I_T$ is the same as the one in step S206 of FIG. 19.

If the value of variable i is not equal to or more than the threshold value $I_T$ (S121: N), the control unit 11 executes step S114. On the other hand, if the value of variable i is equal to or more than the threshold value $I_T$ (S121: Y), the control unit 11 determines whether the frame image [1] and the frame image [j] are the same or substantially the same (S122). This processing is the same as the one in step S204 of FIG. 19.

If it is determined that the frame image [1] and the frame image [j] are not the same or substantially the same (S122: N), the control unit 11 executes step S114. On the other hand, if it is determined that the frame image [1] and the frame image [j] are the same or substantially the same (S122: Y), the control unit 11 terminates the processing. In this case, moving image data including the frame images [1] to [j] is generated as moving image data that shows the item 30 that rotates once.

After step S117 is executed, the control unit 11 determines whether the value obtained by subtracting 1 from the value of variable i is equal to or more than the threshold value $I_T$ (S123). If the value obtained by subtracting 1 from the value of variable i is not equal to or more than the threshold value $I_T$ (S123: N), the control unit 11 executes step S118. On the other hand, if the value obtained by subtracting 1 from the value of variable i is equal to or more than the threshold value $I_T$ (S123: Y), the control unit 11 determines whether the frame image [1] and the frame image [j] are the same or substantially the same (S124).

If it is determined that the frame image [1] and the frame image [j] are not the same or substantially the same (S124: N), the control unit 11 executes step S118. On the other hand, if it is determined that the frame image [1] and the frame image [j] are the same or substantially the same (S124: Y), the control unit 11 terminates the processing. In this case, moving image data including the frame images [1] to [j] is generated as moving image data that shows the item 30 that rotates once.

With the manner described above, moving image data of the item 30 that rotates once can also be generated.

Figure 21:
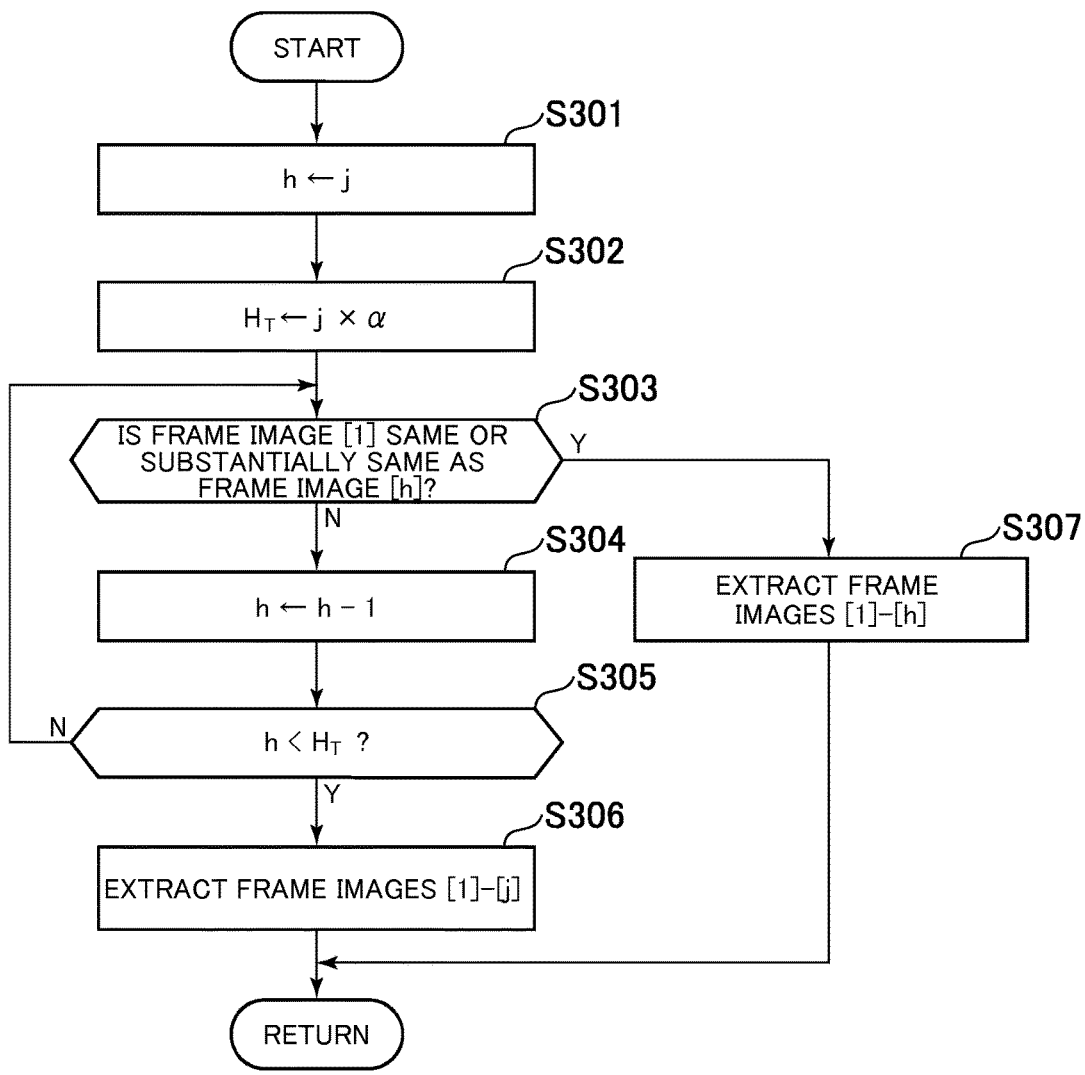
FIG. 21 A flow chart showing another example of processing executed in the image processing device.

Instead of executing steps S121 to S124, it may be configured that the processing shown in FIG. 21 is executed in a case where it is determined that there is no captured image [i] in step S115 or S120. The processing shown in FIG. 21 is processing for extracting moving image data of one rotation from among the frame images [1] to [j] included in the generated moving image data.

In the processing shown in FIG. 21, the control unit 11 substitutes the value of variable j into the variable h (S301), and sets a value obtained by multiplying the variable j by a coefficient α (0<α<1: e.g., ⅓) as a threshold value $H_T$ (S302). The threshold value $H_T$ corresponds to the threshold value $I_T$ in FIGS. 19 and 20.

Subsequently, the control unit 11 determines whether the frame image [1] and the frame image [h] are the same or substantially the same (S303). This processing is the same as the one in step S204 of FIG. 19.

If the frame image [1] and the frame image [h] are not the same or substantially the same (S303: N), the control unit 11 subtracts 1 from the value of variable h (S304). The control unit 11 then determines whether the value of variable h is less than the threshold value $H_T$ (S305). If the value of variable h is not less than the threshold value $H_T$ (S305: N), the control unit 11 executes step S303.

On the other hand, if the frame image [1] and the frame image [h] are the same or substantially the same (S303: Y), the control unit 11 extracts the frame images [1] to [h] as moving image data of the item 30 that rotates once (S307). In this regard, the frame images [1] to [h] are obtained from the once selected frame images [1] to [j] as the moving image data of the item 30 that rotates once. In this case, the frame images [h+1] to [j] are removed.

In a case where the value of variable h is less than the threshold value $H_T$ (S305: Y), the control unit 11 extracts the frame images [1] to [j] (S306). The case where it is determined that the value of variable h is less than the threshold value $H_T$ in step S306 is a case where a frame image 42 corresponding to the image of the point of time when the item 30 completes one rotation could not be found. In this case, the control unit 11 extracts the frame images [1] to [j] as moving image data of the item 30.

The moving image data of the item 30 that rotates once can be generated also by executing the processing shown in FIG. 21 instead of the processing shown in FIG. 20.

In the processing shown in FIG. 21, a frame image 42 having the highest similarly to the frame image [1] among the frame images [HT] to [j] may be searched. Then, the moving image data of the images, starting from the first frame image 42 to the frame image 42 that has been found, may be obtained as moving image data of the item 30 that rotates once. In this manner, the moving image data of the item 30 that rotates once can also be generated.

Using the image processing device 10 described above, it is possible to obtain moving image data in which a rotation angle of the item 30 is approximately constant for each frame based on captured image data obtained by shooting the item 30 rotating at a non-constant angular velocity. Further, using the image processing device 10, it is possible to obtain moving image data of one rotation.

The present invention is not to be limited to the above described embodiment.

[1] In the above, the explanation has been given based on the assumption that the shape of the item 30 is substantially cylindrical, and a radius r of an orbit 80 of each point on the item 30 (circular orbit) is all the same. However, the shape of the item 30 is not limited to a substantially cylindrical shape. In a case where the shape of the item 30 is not substantially cylindrical, the radius r varies at each point, and thus an error may possibly be large if the radius r is assumed to be all the same. As such, the image processing device 10 may have a configuration to suppress occurrence of such an inconvenience.

[1-1] For example, the rotation angle information obtaining unit 56 may be configured to use a feature point 60 having a large radius r in preference to a feature point 60 having a small radius r in order to obtain rotation angle information.

[1-1-1] For example, the rotation angle information obtaining unit 56 may be configured to use only the feature point 60 having a large radius r to obtain rotation angle information, and not to use the feature point 60 having a large radius r, to obtain rotation angle information.

For example, it can be said that a feature point 60 that passes through both inside and outside the observation area 110 corresponds to a point on the item 30 (feature point 60) having a relatively large radius r. As such, it can be configured that, by using only such a feature point 60 to obtain rotation angle information, only a feature point 60 having a relatively large radius r is used to obtain rotation angle information.

In this case, it is enough to determine whether the feature point 60 moves into the observation area 110 from outside the observation area 110, and not necessary to calculate the radius r, and hence an increase of the processing load can be suppressed.

[1-1-2] As a matter of course, the rotation angle information obtaining unit 56 (rotation radius information obtaining means) may be configured to calculate a radius r (rotation radius information) for each feature point 60. And, the rotation angle information obtaining unit 56 may be configured to use only a feature point 60 having a radius r larger than a threshold value in order to obtain rotation angle information, and not to use a feature point 60 having a radius r equal to or less than a threshold value in order to obtain rotation angle information.

[1-2] Further, for example, the rotation angle information obtaining unit 56 (rotation radius information obtaining means) may calculate a radius r (rotation radius information) for each feature point 60. And, the rotation angle information obtaining unit 56 may calculate a pseudo-rotation angle (rotation angle information) of a feature point 60 in accordance with the equation (11), based on a change amount of the X-axis coordinate value of the feature point 60 (position difference information) and the radius r of the feature point 60 in question (rotation radius information). Then, the rotation angle information obtaining unit 56 may use a statistical value (e.g., average value) of the pseudo-rotation angle calculated this way as the pseudo-rotation angle of the item 30.

In the variations 1-1-2 and 1-2 described above, a radius r needs to be calculated. As such, a method for calculating the radius r (rotation radius information) will be discussed.

For example, the rotation angle information obtaining unit 56 (rotation radius information obtaining means) may obtain elliptical orbit information relating to an orbit 70 (elliptical orbit) of a feature point 60 corresponding to a certain point on the item 30, and calculate the radius r based on the elliptical orbit information. For example, the rotation angle information obtaining unit 56 estimates the radius r based on at least one of major and minor diameters of the orbit 70. The rotation angle information obtaining unit 56 obtains, for example, one half of the major diameter of the orbit 70 as the radius r.

If the feature point 60 corresponding to the certain point on the item 30 is specified in at least three of the captured images 40, elliptical orbit information relating to the orbit 70 of the feature points 60 can be obtained. In this case, an accuracy of calculating the orbit 70 may be enhanced as described below.

In a case where an orbit 70 is calculated for each of the feature points 60 respectively corresponding to the certain points on the item 30, the center points of these orbits 70 match and they should be concentric ellipses. As such, the rotation angle information obtaining unit 56 can be configured so as not to use an orbit 70 that has a center point not matching those of the other orbits 70 and is not concentric with other orbits 70.

If the feature point 60 corresponding to a certain point on the item 30 is specified in four or more of the captured images 40, the rotation angle information obtaining unit 56 may obtain a plurality of combinations of three positions of the feature points 60. Further, the rotation angle information obtaining unit 56 may calculate a plurality of orbits 70 respectively corresponding to the combinations. The rotation angle information obtaining unit 56 then may obtain an average of each of the center points and major and minor diameters of the orbits 70 calculated as above as the center point and major and minor diameters of the orbit 70 of the feature point 60. In this way, it is also possible to enhance an accuracy of calculating the orbit 70.

The following method may also be adapted instead of the method described above.

For example, in a case where the feature point 60 corresponding to a certain point on the item 30 is first specified in a captured image [i] (i: an integer of 1 or more) and specified last in a captured image [j] (j: an integer greater than i), the rotation angle information obtaining unit 56 (rotation radius information obtaining means) may obtain the radius r based on positions of the feature point 60 in the captured images [i] and [j].

For example, if the positions of the feature point 60 in the captured images [i] and [j] are both included in an edge area of the existence area 100, the rotation angle information obtaining unit 56 may obtain one half of the length of a straight line connecting the positions of the feature point 60 in question in the captured images [i] and [j] as the radius r. In this regard, the "edge area" is an area within a predetermined distance from the edge of the existence area 100.

Alternatively, the rotation angle information obtaining unit 56 may obtain one half of the difference in the X-axis coordinate values of the feature point 60 between the captured images [i] and [j] as the radius r.

By the way, the pattern on the item 30 deforms around the edge of the existence area 100, and thus a feature amount of a feature point 60 corresponding to the pattern part is different between a case where the feature point 60 is positioned at the center area of the existence area 100 and a case where the feature point 60 is positioned at the edge area of the existence area 100. Accordingly, in a case where the feature point 60 corresponding to the pattern part is positioned at the edge area of the existence area 100, such a feature point 60 could be recognized as being different from the feature point 60 corresponding to the pattern part. Further, when the shooting device 34 and the item 30 are close, there is a case where 180 degrees rotation of the pattern part of the item 30 is not imaged, and only a rotation of an angle less than 180 degrees is imaged. Considering this, the calculation method mentioned previously has an accuracy higher than that of this calculation method. However, this calculation method does not require a calculation of an elliptical orbit, and thus can reduce the processing load compared to the calculation method mentioned previously.

[2] In the above described embodiment, for example, the threshold value $\theta_T$ is set in advance, but the threshold value $\theta_T$ may be dynamically set.

[2-1] For example, the threshold value $\theta_T$ may be determined, based on the number of captured images 40 that serve as a basis for generating moving image data. The threshold value $\theta_T$ may be set in a way that, as the number of the captured images 40 corresponding to one rotation of the item 30 is greater, the threshold value $\theta_T$ is smaller. In this case, it may be configured that correspondence relation information indicating the correspondence relation of the number of captured images 40 and the threshold value $\theta_T$ is stored in the storage unit 12, and this threshold value $\theta_T$ is set based on the correspondence relation information.

As the threshold value $\theta_T$ is smaller, the moving image data becomes smoother. In this regard, with the manner described above, the threshold value $\theta_T$ can be reduced in accordance with captured data, and thus the moving image data can be smoothed as much as possible.

[2-2] Further, for example, the threshold value $\theta_T$ may be changed, when frame images 42 are not selected enough. FIG. 22 is a diagram for explaining this variation.

In this variation, firstly, the control unit 11 sets the threshold value $\theta_T$ to a relatively small value. The control unit 11 then selects frame images 42 so that a rotation angle between the adjacent frame images 42 is the threshold value $\theta_T$.

In this case, the control unit 11 determines whether the frame images 42 have been selected so that the rotation angle between the adjacent frame images 42 is the threshold value $\theta_T$. For example, if a difference between the pseudo-rotation angle between the frame image [j] and the frame image [j+1] and the threshold value $\theta_T$ is within a predetermined range, the control unit 11 assumes that the frame images 42 have been selected so that the rotation angle between the adjacent frame images 42 is the threshold value $\theta_T$. Specifically, if the pseudo-rotation angle is within a range of plus or minus 20% of the threshold value $\theta_T$, the control unit 11 assumes that the frame images 42 have been selected so that the rotation angle between the adjacent frame images 42 is the threshold value $\theta_T$.

Figure 22A:
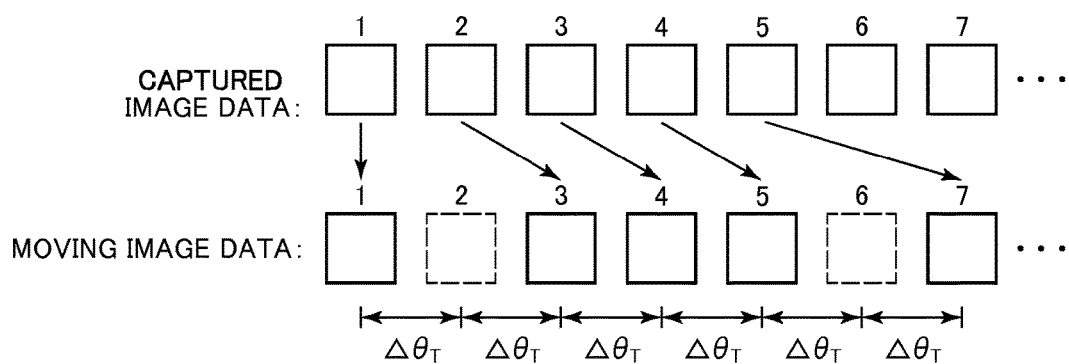
FIG. 22A A diagram illustrating a variation.
Figure 22B:
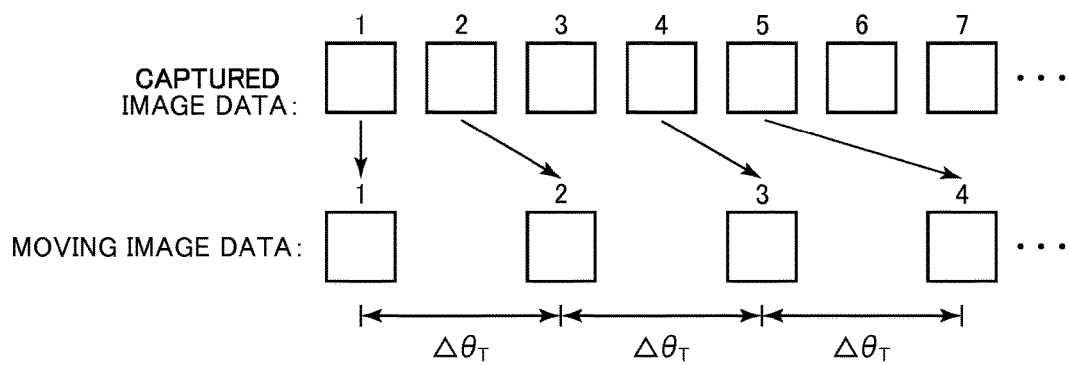
FIG. 22B A diagram illustrating a variation.

Further, in this case, as shown in the frame images [2] and ⌈6⌋ in FIG. 22(A), when the frame images 42 have not been selected so that the rotation angle between the adjacent frame images 42 is the threshold value $\theta_T$, the control unit 11 increases the threshold value $\theta_T$ as shown in FIG. 22(B), and selects the frame images 42 based on the updated threshold value $\theta_T$. Such a processing is repeated until all of the frame images 42 are selected so that the rotation angle between the adjacent frame images 42 is the threshold value $\theta_T$.

In this way, the threshold value $\theta_T$ can also be reduced in accordance with captured image data, and thus the moving image data can be smoothed as much as possible.

[2-3] It may be configured that the captured image data corresponding to multiple rotations is obtained in advance, and a frame image 42, which has not been obtained from the captured image data of the first rotation, is obtained from the captured image data of the second and following rotations. The captured data of the second and following rotations can be extracted in the same way as the captured data of the first rotation is extracted.

For example, in the example shown in FIG. 22(A), the frame image [2], the pseudo-rotation angle between which and the frame image [1] is $\Delta\theta_T$, has not been selected. In this case, a frame image 42, the pseudo-rotation angle between which and the frame image [1] is $\Delta\theta_T$, may be searched from the captured image data of the second and following rotations.

Then, it may be configured that the threshold value $\theta_T$ is increased as shown in FIG. 22(B) only when a frame image 42, the pseudo-rotation angle between which and the frame image [1] is $\Delta\theta_T$, cannot be found from the captured image data of the second and following rotations.

[3] For example, in a case where the shape of item 30 is rotationally symmetric to the rotation axis 32, and only a part of the item 30 (e.g., obverse side) has letters, designs, or patterns, the captured images 40 does not change while the part with letters etc. is not covered by the shooting device 34. In this case, a feature point 60 corresponding to a certain point on the item 30 cannot be specified, and as a result, a change amount of X-axis coordinate values of the feature point 60 cannot be obtained.

Figure 23:
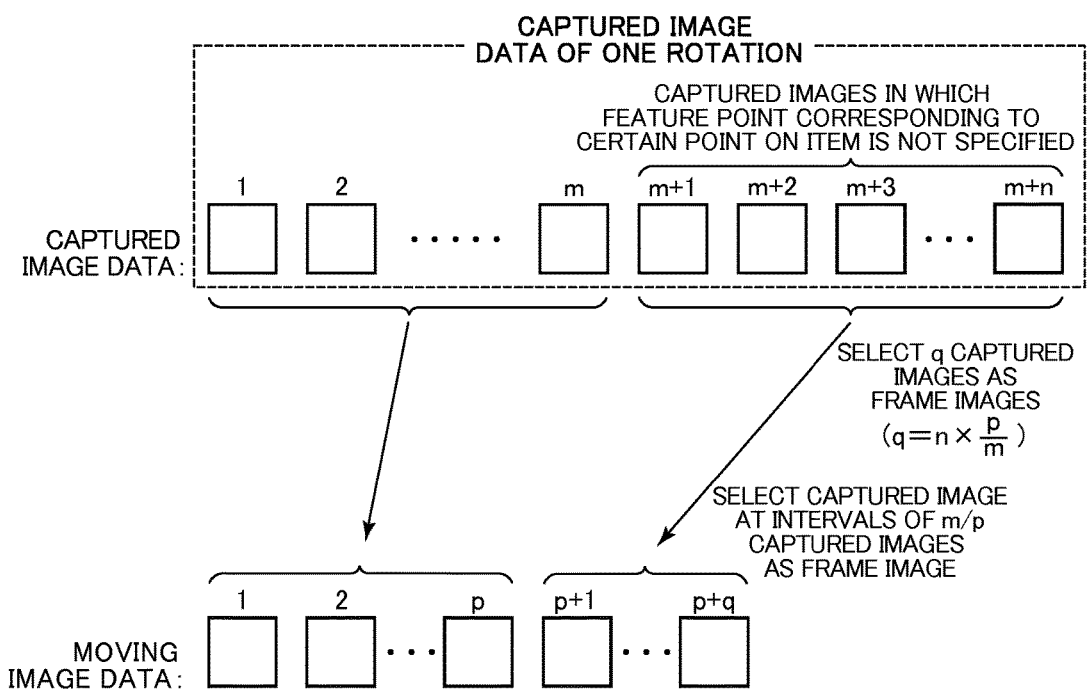
FIG. 23 A diagram illustrating another variation.

FIG. 23 is a diagram for explaining the processing for addressing the inconvenience as mentioned above. FIG. 23 illustrates a case where a feature point 60 corresponding to a certain point on the item 30 is not specified in captured images [m+1] to [m+n] from among captured images [1] to [m+n] included in the captured image data of one rotation.

In this case, the control unit 11 obtains the number of captured images 40 that are selected from the captured images [1] to [m] as frame images 42. In the example of FIG. 23, the number is p.

Then the control unit 11 selects the frame images 42 from the captured images [m+1] to [m+n] based on a ratio of the number of the captured images [1] to [m] to the number of the captured images 40 that are selected from the captured images [1] to [m] as frame images 42.

In the example shown in FIG. 23, the ratio is p/m, and thus the control unit 11 selects the frame images 42 from the captured images [m+1] to [m+n] at the same ratio as this ratio. In other words, the control unit 11 selects q (q: q=n*p/m) captured images 40 from n captured images [m+1] to [m+n] as frame images 42. For example, the control unit 11 selects a captured image 40 as a frame image 42 at intervals of m/p from among the captured images [m+1] to [m+n]. If m/p is "3", the control unit 11 selects captured images [m+3], [m+6], and [m+9], . . . as frame images 42. In this way, it is possible to address the inconvenience as described above.

In the above, a description has been given regarding a case where a feature point 60 corresponding to a certain point on the item 30 is not specified in the captured images [m+1] to [m+n], and the same description can be applied to a case where a feature point 60 corresponding to a certain point on the item 30 is not specified in the captured images [1] to [m]. In this case, the control unit 11 may select frame images 42 from the captured images [1] to [m] based on a ratio of the number of the captured images [m+1] to [m+n] to the number of the captured images 40 that are selected from the captured images [m+1] to [m+n] as frame images 42.

[4] Further, for example, operations of the rotation angle information obtaining unit 56 are not limited to the embodiment described above.

For example, the rotation angle information obtaining unit 56 may obtain elliptical orbit information relating to the orbit 70 of the feature point 60 (elliptical orbit) corresponding to the certain point on the item 30. If a feature point 60 corresponding to a certain point on the item 30 is specified in at least three captured images 40, it is possible to obtain elliptical orbit information of the orbit 70 of the feature point 60 based on the positions of the feature point 60 on these captured images 40.

In a case where, for example, a rotation angle of the item 30 between the point of time when the captured image [i] is shot and the point of time when the captured image [i+k] (k: an integer of 1 or more) is shot is calculated, the rotation angle information obtaining unit 56 may calculate the rotation angle based on the position of the feature point 60 on the captured image [i], the position of the feature point 60 on the captured image [i+k], and the elliptical orbit information. In this manner, the rotation angle information of the rotation angle of the item 30 between the point of time when the captured image [i] is shot and the point of time when the captured image [i+k] is shot can also be obtained.

The invention claimed is:

1. An image processing device comprising:
at least one processor; and
at least one memory device that stores a plurality of instructions, which when executed by the at least one processor, cause the at least one processor to:
obtain a plurality of captured images that are obtained by repeatedly shooting an object while the object rotates at non-constant angular velocity;
specify one or more feature points in the captured images,
obtain, when a feature point corresponding to a certain point on the object is specified in a pair of captured images, position information relating to positions of the feature point in the pair of captured images, one of the pair of captured images being shot before the other of the pair of captured images;
obtain rotation angle information relating to a rotation angle of the object between a point of time when the one of the pair of captured images is shot and a point of time when the other of the pair of captured images is shot, based solely on the position information from the captured images; and
generate moving image data which shows how the object rotates, by selecting a plurality of frame images of the moving image data from among the plurality of captured images, based on the rotation angle information obtained by for each of the plurality of captured images
wherein the at least one processor:
determines, when an i-th captured image among the plurality of captured images is selected as a j-th frame image of the moving image data, determine whether or not the rotation angle information $\Delta\theta_{i,i+k}$ between a point of time when the i-th captured image is shot and a point of time when an (i+k)-th captured image among the plurality of captured images is shot is equal to or more than a constant value $\theta_T$, where i is an integer of 1 or more, j is an integer of 1 or more, and k is an integer of 1 or more;
determines, when it is determined that the rotation angle information $\Delta\theta_{i,i+k}$ is less than the constant value $\theta_T$, whether or not the rotation angle information $\Delta\theta_{i,i+k+1}$ between the point of time when the i-th captured image is shot and a point of time when an (i+k+1)-th captured image among the plurality of captured images is shot is equal to or more than the constant value $\theta_T$; and selects, when it is determined that the rotation angle information $\Delta\theta_{i,i+k+1}$ is equal to or more than the constant value $\theta_T$, either one of the (i+k)-th captured image and the (i+k+1)-th captured image as a (j+1)-th frame image of the moving image data.

2. The image processing device according to claim 1, wherein, when a feature point corresponding to a certain point on the object is specified on a first pair of captured images, the at least one processor obtains position information relating to a position of the feature point in a first captured image that is shot first among the first pair of captured images and in a second captured image that is shot later among the first pair of captured images, wherein the at least one processor obtains rotation angle information relating to a rotation angle of the object between a point of time when the first captured image of the first pair of captured images is shot and a point of time when the second captured image of the first pair of captured images is shot based on the position information of the first pair of captured images, wherein, when a feature point corresponding to a certain point on the object is specified in a second pair of captured images, the at least one processor obtains position information relating to a position of the feature point of a first captured image that is shot first among the second pair of captured images and a second captured image that is shot later among the second pair of captured images, wherein the at least one processor obtains rotation angle information relating to a rotation angle of the object between a point of time when the first captured image of the second pair of captured images is shot and a point of time when the second captured image of the second pair of captured images is shot based on the position information of the second pair of captured images, wherein, when the second captured image of the first pair of captured images is identical to the first captured image of the second pair of captured images, the at least one processor obtains cumulative rotation angle information relating to a rotation angle of the object between the point of time when the first captured image of the first pair of captured images is shot and the point of time when the second captured image of the second pair of captured images is shot, based on the rotation angle information of the first pair of captured images and the rotation angle information of the second pair of captured images, and wherein the at least one processor selects a plurality of frame images of the moving image data from the plurality of captured images based on the cumulative rotation angle information.

3. The image processing device according to claim 2, wherein, when the first captured image of the first pair of captured images is selected as a frame image of the moving image data, the at least one processor determines whether or not to select the second captured image of the second pair of captured images as another frame image of the moving image data, based on a result of comparing the cumulative rotation angle information with the constant value $\theta_T$.

4. The image processing device according to claim 3, wherein, when the first captured image of the first pair of captured images is selected as a frame image of the moving image data and the cumulative rotation angle information is equal to or more than the constant value $\theta_T$, the at least one processor selects either one of the second captured image of the second pair of captured images and a third captured image that was shot immediately before the second captured image of the second pair of captured images as another frame image of the moving image data.

5. The image processing device according to claim 1, wherein the at least one processor obtains the rotation angle information using the change amount of a feature point whose rotation radius of when the object rotates is a first rotation radius, in preference to the change amount of a feature point whose rotation radius of when the object rotates is a second rotation radius which is smaller than the first radius.

6. The image processing device according to claim 1, wherein the at least one processor:

obtains, when a plurality of feature points respectively corresponding to a plurality of points on the object are specified in the pair of captured images, rotation radius information relating to a rotation radius of a point on the object corresponding to the feature point, for each of the plurality of feature points;

obtains, for each of the plurality of feature points, rotation angle information relating to a rotation angle of the point corresponding to the feature point on the object between a point of time when the one of the pair of captured images is shot and a point of time when the other of the pair of captured images is shot, based on the change amount and the rotation radius information of the feature points; and obtains the rotation angle information of the object based on the rotation angle information of each of the plurality of feature points.

7. The image processing device according to claim 6, wherein the at least one processor:

obtains, when the feature point corresponding to the certain point on the object is specified in at least three captured images, elliptical orbit information relating to an elliptical orbit of the feature point based on the position of the feature point in the at least three captured images; and obtains the rotation radius information of the feature point based on the elliptical orbit information of the feature point.

8. The image processing device according to claim 6, wherein, when the feature point corresponding to the certain point on the object is first specified in a p-th, where p is an integer of 1 or more, captured image and specified last in a q-th, where q is an integer greater than p, captured image that is shot later than the p-th captured image, the at least one processor obtains the rotation radius information of the feature point based on a position of the feature point in the p-th captured image and a position of the feature point in the q-th captured image.

9. The image processing device according to claim 1, wherein the at least one processor:

obtains, when the feature point corresponding to the certain point on the object is specified in at least three captured images, elliptical orbit information relating to an elliptical orbit of the feature point; and obtains the rotation angle information based on the positions of the feature point in the pair of captured images and the elliptical orbit information.

10. The image processing device according to claim 1, wherein the at least one processor:
   obtains similarity information relating to a similarity between a reference captured image that is selected from the plurality of captured images and each of a plurality of captured images that are shot after a predetermined period of time passes from a point of time when the reference captured image is shot;
   selects one of the plurality of captured images that are shot after the predetermined period of time passes from the point of time when the reference captured image is shot as a captured image of a point of time when the object completes one rotation based on the similarity information; and
   generates the moving image data showing how the object rotates once based on captured images that are shot before the point of time when the captured image selected as the captured image of the time when the object completes one rotation is shot.

11. The image processing device according to claim 10, wherein the at least one processor:
   obtains a number of feature points corresponding to feature points specified in the reference captured image, from among the feature points specified in the captured image that is shot after the predetermined period of time passes from the point of time when the reference captured image is shot;
   selects candidates of the captured image of the point of time when the object completes one rotation, from among the plurality of captured images that are shot after the predetermined period of time passes from the point of time when the reference captured image is shot, based on the obtained number of feature points;
   obtains similarity information relating to a similarity between the reference captured image and each of the captured images selected as the candidates; and
   selects one of the captured images selected as the candidates as the captured image of a point of time when the object completes one rotation based on the similarity information.

12. The image processing device according to claim 1, wherein the plurality of captured images include the 1st to mth, where m is an integer of 2 or more, captured images and m+1 th to m+nth, where n is an integer of 1 or more, captured images, which are shot after the mth captured image,
wherein the at least one processor:
   obtains a number of the captured images selected as frame images of the moving image data out of the 1st to the mth captured images; and
   selects the frame images of the moving image data out of the m+1th to the m+nth captured images, when the feature point corresponding to the point on the object is not specified in the m+1th to the m+nth captured images, based on a ratio of a number of the 1st to the mth captured images to the obtained number of the captured images.

13. The image processing device according to claim 1, wherein the plurality of captured images include the 1st to mth, where m is an integer of 2 or more, captured images and m+1th to m+nth, where n is an integer of 1 or more, captured images, which are shot after the mth captured image,
wherein the at least one processor:
   obtains a number of the captured images selected out of the m+1th to the m+nth captured images as the frame images of the moving image data; and
   selects the frame images of the moving image data out of the 1st to the mth captured images, when the feature point corresponding to the point on the object is not specified in the 1st to the mth captured images, based on a ratio of a number of the m+1th to the m+nth captured images to the obtained number of the captured images.

14. The image processing device according to claim 1, wherein the plurality of instructions further causes the at least one processor to:
   determine whether or not a feature amount of the feature point specified in the one of the pair of captured images and a feature amount of the feature point specified in the other of the pair of captured images are the same or substantially the same;
   determine whether or not a difference of a coordinate value of a direction of an axis corresponding to a rotation axis of the object between the position of the feature point specified in the first captured image and the position of the feature point specified in the second captured image is equal to or more than a threshold value; and
   determine whether or not the feature point specified in the one of the pair of captured images and the feature point specified in the other of the pair of captured images are feature points corresponding to the certain point on the object based on a determination result of whether or not the feature amount of the feature point specified in the one of the pair of captured images and the feature amount of the feature point specified in the other of the pair of captured images are the same or substantially the same and a determination result of the difference is equal to or more than the threshold value.

15. The image processing device according to claim 1, wherein the plurality of instructions further cause the at least one processor to:
   determine whether or not the feature amount of the feature point specified in the one of the pair of captured images and the feature amount of the feature point specified in the other of the pair of captured images are the same or substantially the same;
   compare (a) information relating to a difference of a coordinate value of a direction of a second axis perpendicular to a first axis corresponding to a rotation axis of the object between the position of a first feature point in the one of the pair of captured images and the position of the first feature point in the other of the pair of captured images with (b) information relating to a difference of a coordinate value of the direction of the second axis between the position of a second feature point in the one of the pair of captured images and the position of the second feature point in the other of the pair of captured images, when the first feature point having the same or substantially the same feature amount in both of the pair of captured images, and the second feature point having the same or substantially the same feature amount in both of the pair of captured images are specified; and
   determine whether or not the feature point specified in the one of the pair of captured images and the feature point specified in the other of the pair of captured images are feature points corresponding to the certain point on the object, based on a determination result of whether or not the feature amount of the feature point specified in the one of the pair of captured images and the feature amount of the feature point specified in the other of the pair of captured image are the same or substantially the same and a comparing result of the (a) information with the (b) information.

16. The image processing device according to claim 1, wherein the at least one processor obtains a plurality of captured images that are obtained by repeatedly shooting the object while the object rotates a plurality of times, and
wherein the at least one processor generates the moving image data that shows how the object rotates once based on the plurality of captured images that are obtained by repeatedly shooting the object while the object rotates the plurality of times.

17. An image processing method comprising:
obtaining a plurality of captured images that are obtained by repeatedly shooting an object while the object rotates at non-constant angular velocity;
specifying one or more feature points in the captured images;
obtaining, when a feature point corresponding to a certain point on the object is specified in a pair of captured images, position information relating to positions of the feature point in the pair of captured images, one of the pair of captured images being shot before the other of the pair of captured images;
obtaining rotation angle information relating to a rotation angle of the object between a point of time when the one of the pair of captured images is shot and a point of time when the other of the pair of captured images is shot, based solely on the position information from the captured images; and
generating moving image data by selecting a plurality of frame images of the moving image data, which shows how the object rotates, from among the plurality of captured images, based on the rotation angle information obtained for each of the plurality of captured images
wherein the generating comprises:
determining, when an i-th captured image among the plurality of captured images is selected as a j-th frame image of the moving image data, determine whether or not the rotation angle information $\Delta\theta_{i,i+k}$ between a point of time when the i-th captured image is shot and a point of time when an (i+k)-th captured image among the plurality of captured images is shot is equal to or more than a constant value $\theta_T$, where i is an integer of 1 or more, j is an integer of 1 or more, and k is an integer of 1 or more;
determining, when it is determined that the rotation angle information $\Delta\theta_{i,i+k}$ is less than the constant value $\theta_T$, whether or not the rotation angle information $\Delta\theta_{i,i+k+1}$ between the point of time when the i-th captured image is shot and a point of time when an (i+k+1)-th captured image among the plurality of captured images is shot is equal to or more than the constant value $\theta_T$; and
selecting, when it is determined that the rotation angle information $\Delta\theta_{i,i+k+1}$ is equal to or more than the constant value $\theta_T$, either one of the (i+k)-th captured image and the (i+k+1)-th captured image as a (j+1)-th frame image of the moving image data.

18. A non-transitory computer-readable information storage medium that stores a program for causing a computer to:
obtain a plurality of captured images that are obtained by repeatedly shooting an object while the object rotates at non-constant angular velocity;
specify one or more feature points in the captured images,
obtain, when a feature point corresponding to a certain point on the object is specified in a pair of captured images, position information relating to positions of the feature point in the pair of captured images, one of the pair of captured images being shot before the other of the pair of captured images;
obtain rotation angle information relating to a rotation angle of the object between a point of time when the one of the pair of captured images is shot and a point of time when the other of the pair of captured images is shot, based solely on the position information from the captured images; and
generate moving image data by selecting a plurality of frame images of the moving image data, which shows how the object rotates, from among the plurality of captured images, based on the rotation angle information obtained for each of the plurality of captured images,
wherein the program causes the computer to:
determine, when an i-th captured image among the plurality of captured images is selected as a j-th frame image of the moving image data, determine whether or not the rotation angle information $\Delta\theta_{i,i+k}$ between a point of time when the i-th captured image is shot and a point of time when an (i+k)-th captured image among the plurality of captured images is shot is equal to or more than a constant value $\theta_T$, where i is an integer of 1 or more, j is an integer of 1 or more, and k is an integer of 1 or more;
determine, when it is determined that the rotation angle information $\Delta\theta_{i,i+k}$ is less than the constant value $\theta_T$, whether or not the rotation angle information $\Delta\theta_{i,i+k+1}$ between the point of time when the i-th captured image is shot and a point of time when an (i+k+1)-th captured image among the plurality of captured images is shot is equal to or more than the constant value $\theta_T$; and
select, when it is determined that the rotation angle information $\Delta\theta_{i,i+k+1}$ is equal to or more than the constant value $\theta_T$, either one of the (i+k)-th captured image and the (i+k+1)-th captured image as a (j+1)-th frame image of the moving image data.

19. The image processing device according to claim 1, wherein the at least one processor ignores feature points in a background area other than an area in which the object is included.

20. The image processing device according to claim 1, wherein the at least one processor:
obtains a change amount of a position in an axial direction of a first axis between the position of the feature point in the one of the pair of captured images and the position of the feature point in the other of the pair of captured image, said first axis being perpendicular to a second axis corresponding to a rotation axis of the object in the captured image; and
obtains the rotation angle information that is the rotation angle of the object between the point of time when the one of the pair of captured images is shot and the point of time when the other of the pair of captured images is shot and that is used for selecting the plurality of frame images of the moving image data of the rotating object from among the plurality of captured images, based on the change amount, wherein the at least one processor:
specifies a straight line corresponding to a rotation axis of the object in the captured image;
sets, as an observation area, an area in the captured image through the center of which the specified straight line corresponding to a rotation axis of the object passes and which has a predetermined width around the specified straight line; and
ignores feature points outside the observation area.

21. The image processing device according to claim 1, wherein the at least one processor:
selects, when it is determined that the rotation angle information $\Delta\theta_{i,i+k+1}$ is equal to or more than the constant value $\theta_T$ and the rotation angle information $\Delta\theta_{i,i+k+1}$ is closer to the constant value $\theta_T$ than the rotation angle information $\Delta\theta_{i,i+k}$, the (i+k+1)-th captured image as the (j+1)-th frame image of the moving image data, and
selects, when it is determined that the rotation angle information $\Delta\theta_{i,i+k+1}$ is equal to or more than the constant value $\theta_T$ and the rotation angle information $\Delta\theta_{i,i+k}$ is closer to the constant value $\theta_T$ than the rotation angle information $\Delta\theta_{i,i+k+1}$, the (i+k)-th captured image as the (j+1)-th frame image of the moving image data.

22. The image processing device according to claim 1, wherein the at least one processor calculates a sum of the rotation angle information $\Delta\theta_{i,i+k}$ and the rotation angle information $\Delta\theta_{i+k,i+k+1}$ between the point of time when the (i+k)-th captured image is shot and the point of time when the (i+k+1)-th captured image, to thereby obtain the rotation angle information $\Delta\theta_{i,i+k+1}$.

* * * * *